(12) United States Patent
Nickols

(10) Patent No.: US 9,653,962 B2
(45) Date of Patent: May 16, 2017

(54) APPARATUS AND AN ASSEMBLY FOR EMULATING AN IMPULSE FORCE EXERTED BY A SKELETAL MUSCLE

(75) Inventor: Francis Malcolm John Nickols, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 920 days.

(21) Appl. No.: 13/980,014

(22) PCT Filed: Jan. 20, 2012

(86) PCT No.: PCT/SG2012/000019
§ 371 (c)(1),
(2), (4) Date: Oct. 29, 2013

(87) PCT Pub. No.: WO2012/099543
PCT Pub. Date: Jul. 26, 2012

(65) Prior Publication Data
US 2014/0042845 A1  Feb. 13, 2014

Related U.S. Application Data

(60) Provisional application No. 61/434,968, filed on Jan. 21, 2011.

(51) Int. Cl.
*B25J 9/10* (2006.01)
*H02K 7/00* (2006.01)

(52) U.S. Cl.
CPC ............ *H02K 7/003* (2013.01); *B25J 9/1075* (2013.01)

(58) Field of Classification Search
CPC ...................................................... H02K 7/003
USPC .................................................. 310/84, 300
See application file for complete search history.

(56) References Cited

U.S. PATENT DOCUMENTS

| 5,311,109 A | 5/1994 | Ozawa |
| 5,650,704 A | 7/1997 | Pratt et al. |
| 5,950,773 A * | 9/1999 | Ito ............................ B23Q 1/28 188/28 |
| 2002/0083710 A1* | 7/2002 | Schneider ................. B82B 1/00 60/721 |
| 2008/0277552 A1 | 11/2008 | Duval |
| 2008/0288107 A1 | 11/2008 | Tokita |
| 2010/0241274 A1* | 9/2010 | Ohtera ................... B25J 9/1075 700/245 |

(Continued)

FOREIGN PATENT DOCUMENTS

| CN | 101204815 A | 6/2008 | |
| JP | WO 2009084304 A1 * | 7/2009 | ............ B25J 9/1075 |
| WO | WO 89/11381 A1 | 11/1989 | |

*Primary Examiner* — Thomas Truong
(74) *Attorney, Agent, or Firm* — Jenkins, Wilson, Taylor & Hunt

(57) ABSTRACT

Various embodiments provide, an apparatus for emulating an impulse force exerted by a skeletal muscle, the apparatus including a mass and an actuator, the actuator being adapted to exert a unidirectional force, a unidirectional torque, a unidirectional moment or a unidirectional couple, on the mass, the apparatus being configured in use to selectively couple together the mass and the actuator so that the unidirectional force, a unidirectional torque, a unidirectional moment or a unidirectional couple exerted on the mass by the actuator emulates the impulse force.

19 Claims, 34 Drawing Sheets

(56) References Cited

U.S. PATENT DOCUMENTS

2010/0312363 A1* 12/2010 Herr .................. A61F 2/64
623/39

* cited by examiner

1304

1302

APPARATUS AND AN ASSEMBLY FOR EMULATING AN IMPULSE FORCE EXERTED BY A SKELETAL MUSCLE

CROSS-REFERENCE TO RELATED APPLICATION

This application is filed under the provisions of 35 U.S.C. 371 and claims the priority of International Patent Application No. PCT/SG2012/000019 filed on Jan. 20, 2012, and of U.S. Provisional Patent Application No. 61/434,968, filed on Jan. 21, 2011. The disclosures of the foregoing international patent application and U.S. provisional patent application are hereby incorporated by reference herein in their respective entireties.

TECHNICAL FIELD

Various embodiments relate to an apparatus and an assembly for emulating an impulse force exerted by a skeletal muscle. In various embodiments, an apparatus that imparts impulse force with extremely low output impedance by passive means and that emulates flexing and extending skeletal muscles.

BACKGROUND

Tetherless, autonomous robots capable of a variety of motion, such as, for example, running, jumping, flying, and swimming, have many applications. Such robots may be deployed in military applications, remote maintenance, and prosthetics, amongst other things.

Such tetherless, autonomous robots may possess limbs that mimic or emulate normal human movement. Accordingly, the robots limbs may have to be actuated and reciprocated in as close a manner to human skeletal muscles that actuate limbs.

SUMMARY

Various embodiments provide an apparatus for emulating an impulse force exerted by a skeletal muscle, the apparatus including a mass that represents a robot limb or a machine element and an actuator, the actuator being adapted to exert a unidirectional force, a unidirectional torque, a unidirectional moment or a unidirectional couple on the mass, the apparatus being configured in use to selectively couple together the mass and the actuator so that the unidirectional force, the unidirectional torque, the unidirectional moment or the unidirectional couple exerted on the mass by the actuator provides the impulse force.

In an embodiment, only a unidirectional force, a unidirectional torque, a unidirectional moment or a unidirectional couple is exerted on the mass, namely the unidirectional force, the unidirectional torque, the unidirectional moment or the unidirectional couple does not change direction or reciprocate. However, the robot limb or machine element is not restricted, notwithstanding the said unidirectional force, the unidirectional torque, the unidirectional moment or the unidirectional couple, from displacement in the opposite direction or the same direction to the said unidirectional force, the unidirectional torque, the unidirectional moment or the unidirectional couple.

Various embodiments provide an assembly for emulating an impulse force exerted by a skeletal muscle, the assembly including a pair of apparatuses, each apparatus including a mass and an actuator, the actuator being adapted to exert a unidirectional force, a unidirectional torque, a unidirectional moment or unidirectional couple on the mass in opposite directions, each apparatus being configured in use to selectively couple together the mass and the actuator so that the pair of unidirectional forces, unidirectional torques, unidirectional moments or unidirectional couples exerted on the mass by the actuators emulate the impulse forces of agonistic and antagonistic skeletal muscle.

Various embodiments provide an apparatus for emulating first (e.g. flexing) and second (e.g. extending) impulse forces exerted by a skeletal muscle, the apparatus including a mass and an actuator, the actuator being capable of actuating in only one direction and being adapted to exert a flexing unidirectional force, unidirectional torque, unidirectional moment or unidirectional couple on the mass and a second unidirectional force, a second unidirectional torque, a second unidirectional moment or a second unidirectional couple on the mass, the first unidirectional force, the first unidirectional torque, the first unidirectional moment or the first unidirectional couple acting on the mass in an opposite direction to the second unidirectional force, the second unidirectional torque, the second unidirectional moment or the second unidirectional couple, the apparatus being configured in use to selectively couple together the mass and the actuator so that the first unidirectional force, the first unidirectional torque, the first unidirectional moment or the first unidirectional couple exerted on the mass by the actuator emulates the first impulse force, the apparatus being configured in use to selectively couple together the mass and the actuator so that the second unidirectional force, the second unidirectional torque, the second unidirectional moment or the second unidirectional couple exerted on the mass by the actuator emulates the second impulse force.

BRIEF DESCRIPTION OF THE DRAWINGS

In the drawings, like reference characters generally refer to like parts throughout the different views. The drawings are not necessarily to scale, emphasis instead generally being placed upon illustrating the principles of some example embodiments of the invention. In the following description, various example embodiments of the invention are described with reference to the following drawings, in which.

DETAILED DESCRIPTION

Figure 1:
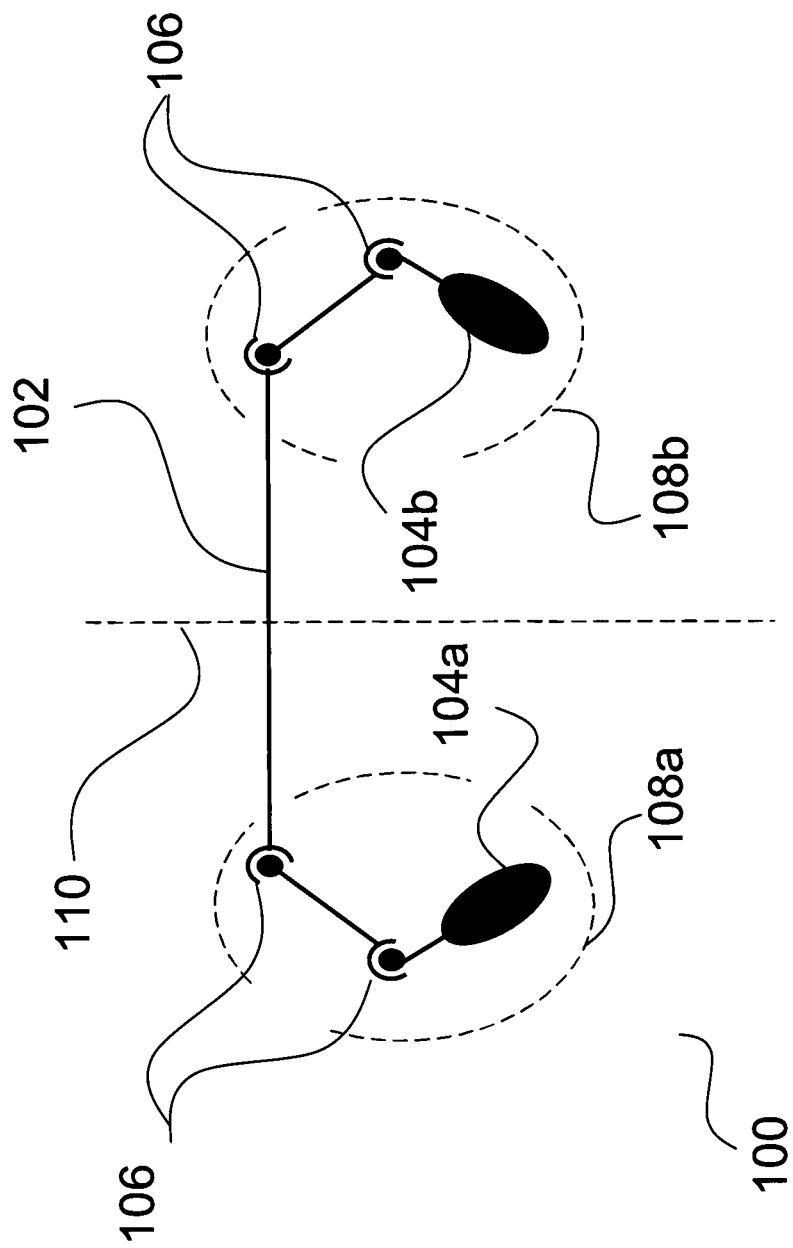
FIG. 1 illustrates an articulated myosin structure.

The following detailed description refers to the accompanying drawings that show, by way of illustration, specific details and embodiments in which the invention may be practised. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Various embodiments provide an apparatus for emulating an impulse force exerted by a skeletal muscle, the apparatus including a mass and an actuator, the actuator being adapted to exert a unidirectional force, a unidirectional torque, a unidirectional moment or a unidirectional couple, on the mass, the apparatus being configured in use to selectively couple together the mass and the actuator so that the unidirectional force, the unidirectional torque, the unidirectional moment or the unidirectional couple, exerted on the mass by the actuator emulates the impulse force.

In an embodiment, the unidirectional force is a unidirectional rectilinear force vector.

In an embodiment, the unidirectional force, is a unidirectional rotational moment of force.

In an embodiment, the unidirectional rotational force is along a circular trajectory with constant radius about a fixed centre. Need to discuss/think about this one In an embodiment, the apparatus further includes a clamping mechanism configured in use to selectively couple together the mass and the actuator using a clamping force.

In an embodiment, the actuator includes the clamping mechanism, and the clamping force is applied to the actuator to selectively couple the actuator to the mass.

In an embodiment, the mass includes the clamping mechanism, and the clamping force is applied to the mass to selectively couple the mass to the actuator.

In an embodiment, the mass is coupled to the clamping mechanism, and the clamping force is applied to the clamping mechanism to selectively couple together the actuator and the mass.

In an embodiment, the mass is pivotally coupled to the clamping mechanism, and the clamping force is applied to the clamping mechanism to selectively couple together the actuator and the mass.

In an embodiment, the clamping mechanism includes a pair of friction pads, at least a portion of the actuator being positioned between the pair of friction pads, the pair of friction pads being configured in use to move towards each other to apply the clamping force. In an embodiment, the clamping mechanism includes a clamping of the moving surface between one friction pad and a (low) friction surface or free wheel.

In an embodiment, the pair of friction pads are coupled together to inhibit relative movement between each friction pad in a direction perpendicular to the clamping force.

In an embodiment, the pair of friction pads is stiff in a direction perpendicular to the clamping force.

In an embodiment, the clamping mechanism includes an electromagnetic eddy current damper, the damper being configured in use to apply the clamping force.

In an embodiment, the clamping mechanism is configured in use to apply a variable clamping force.

In an embodiment, the apparatus further includes a control system configured in use to control the variable clamping force to reduce slippage between the mass and the actuator.

In an embodiment, the actuator includes a continuously moving structure, and the apparatus is configured in use to selectively couple together the mass and the continuously moving structure to exert the unidirectional force, the unidirectional torque, the unidirectional moment or the unidirectional couple on the mass.

In an embodiment, the continuously moving structure is a rotating member.

In an embodiment, the mass is pivotally coupled to the rotating member.

In an embodiment, the mass is pivotally coupled to the rotating member at the rotational axis of the rotating member.

In an embodiment, the rotating member is a rotating wheel.

In an embodiment, the continuously moving structure is a belt and pulley system.

In an embodiment, the belt and the pulley surfaces have cooperating features which in use engage together to prevent slippage of the belt with respect to the pulley.

In an embodiment, at least one pulley is translatable and configured in use to translate to tauten the belt.

In an embodiment, the belt is stiff in the direction of the clamping force.

In an embodiment, the continuously moving structure is configured in use to have a variable speed.

In an embodiment, the apparatus further includes a resilient structure, the resilient structure being configured in use to urge the mass towards a resting position when the mass and the actuator are decoupled.

In an embodiment, the resilient structure includes one or more resilient members.

Various embodiments provide an assembly for emulating an impulse force exerted by a skeletal muscle, the assembly including a pair of apparatuses, the features of the above described apparatus being equally applicable, and hereby restated, in respect of each apparatus of the pair of apparatuses.

In an embodiment, each apparatus of the assembly being configured in use to exert its unidirectional force, unidirectional torque, unidirectional moment or unidirectional couple in an opposite direction to the other apparatus of the assembly.

Various embodiments provide an apparatus for emulating first and second impulse forces exerted by a skeletal muscle, the apparatus including a mass and an actuator, the actuator being capable of actuating in only one direction and being adapted to exert a first unidirectional force, a first unidirectional torque, a first unidirectional moment or a first unidirectional couple, on the mass and a second unidirectional force, a second unidirectional torque, a second unidirectional moment or a second unidirectional couple, on the mass, the first unidirectional force, the first unidirectional torque, the first unidirectional moment or the first unidirectional couple acting on the mass in an opposite direction to the second unidirectional force, the second unidirectional torque, the second unidirectional moment or the second unidirectional couple, the apparatus being configured in use to selectively couple together the mass and the actuator so that the first unidirectional force, the first unidirectional torque, the first unidirectional moment or the first unidirectional couple exerted on the mass by the actuator emulates the first impulse force, the apparatus being configured in use to selectively couple together the mass and the actuator so that the second unidirectional force, the second unidirectional torque, the second unidirectional moment or the second unidirectional couple exerted on the mass by the actuator emulates the second impulse force.

In an embodiment, the actuator including a continuously rotating structure, the apparatus being configured in use to selectively couple together the mass and a first portion of the continuously rotating structure so that the first unidirectional force, the first unidirectional torque, the first unidirectional moment or the first unidirectional couple, exerted on the mass by the actuator emulates the first impulse force, the apparatus being configured in use to selectively couple together the mass and a second portion of the continuously rotating structure so that the second unidirectional force, the second unidirectional torque, the second unidirectional moment or the second unidirectional couple exerted on the mass by the actuator emulates the second impulse force.

The further features described with reference to the first apparatus are equally applicable, and hereby restated, in respect of the above apparatus.

Actuators are capable of providing articulation forces in machine systems, such as, for example, moving limbed systems in autonomous mobile robots. Typical actuators use a range of physical phenomena to provide a force. The types of physical phenomena may be, but not limited to, electromagnetic force, hydraulic force, pneumatic force, piezoelectric force, shape memory alloy, electric charge force, and electrically activated polymers.

Some actuators may not be capable of providing a desired force, such as, for example, a force whose magnitude is comparable to biological skeletal muscle. Accordingly, such actuators may be inadequate in applications that may require artificial skeletal muscles since the actuators do not mimic biological skeletal muscle accurately.

Biological skeletal muscle is capable of possessing the following ten properties: (i) high force-to-weight ratio, (ii) fast reaction time (less than 0.1 second response time to a maximum force) that, in alliance with the high force-to-weight ratio of (i), produces high mechanical power-to-weight ratio, (iii) low physical volume, (iv) low strain energy stored in the skeletal muscle fibers, (v) significant latent force energy stored in the skeletal muscle for approximately 1 minute in order to permit initial explosive output of power, such as, for example, an Olympic sprinter, (vi) soundless in operation, (vii) self centering, implying that the skeletal muscle, when relaxed, is capable of tending to attain a length half way between fully contracted and fully stretched, (viii) bendable and twistable, similar to a rubber or silicone tube or sheet so the skeletal muscle may be laid neatly in muscle packs, (ix) low reflected inertia seen by a limb and, (x) negligible forward and backward drivable force.

The first property, namely high force-to-weight ratio, relates to the weight of an energy medium, such as, for example, electric batteries; petrol or gas; an air or hydraulic pump; an electric generator; or control equipment, such as, for example, valves, transistors, computers, wires, pipes. The last two properties, namely low reflected inertia seen by a limb and negligible forward and backward drivable force, relate to a limb, such as, for example, a human arm, being able to become limp and easily moved when its skeletal muscles are relaxed and not activated.

Some currently existing actuators are not capable of being easily forward or backward driven, with the exception of a direct drive brushless electric motor, such as, for example, a brushless electric motor without a gearbox. Whilst the direct drive brushless electric motor may be forward and backward driveable, the motor may not posses other desirable properties of biological skeletal muscles, such as, for example, low reflected inertia, and/or high force-to-weight ratio, and/or high mechanical power-to-weight ratio. Accordingly, direct drive brushless electric motor may be inadequate as artificial skeletal muscles.

Some currently existing electric motors may possess adequate mechanical power for artificial muscles, but these electric motors may produce high power only at high speed with low torque (or force), rather than low speed and high torque. Accordingly, these electric motors may require their speeds to be reduced and their torque (or force) increased using a high reduction gearbox, with a reduction ratio in the order of at least 200:1. Such a gearbox suffers from friction brought about by the high reduction ratio, thus producing low forward and backward driveability and high bidirectional output impedance. The terms "forward and backward driveability" and "bidirectional output impedance" are explained later. Even if a high-efficiency gearbox is used to reduce friction, the motor-gearbox system may suffer from high reflected inertia due to the reduction ratio amplifying the inertia of moving parts by the square of the reduction ratio. Accordingly, electric motor-gearbox actuators may also be inadequate as artificial skeletal muscles.

Some currently existing high performance direct drive linear electric motor actuators use high power neodymium-boron-iron magnets. This class of electric motor actuators satisfies many of the biological skeletal muscle properties, except for the requirement of high force-to-weight ratio and high mechanical power-to-weight ratio. This may be a result of not using a reduction gearbox. An electric motor may produce its maximum mechanical power output when the electric motor is rotating at high speed. Adding a reduction gearbox may result in a combined electric motor-gearbox actuator that has a maximized force-to-weight ratio. However, whilst the gearbox may be made a using light weight material, the above mentioned electric motors may use high mass density copper and magnet components. Accordingly, such actuators may still fail the requirements of high force-to-weight ratio and high mechanical power-to-weight ratio. Therefore, combined electric motor-gearbox actuators may also be inadequate as artificial skeletal muscles.

Besides electric motors, pneumatic and hydraulic systems may also be used as actuators. In general, there are two types of pneumatic systems. The first type uses a piston and cylinder, whilst the second type uses a bag that, as it fills with air, becomes shorter and fatter, similar to the shape change of a real muscle. Both types of pneumatic systems may suffer from lack of forward and backward driveability due to piston friction and valve flow losses. Further, pneumatic systems may also suffer from poor force control due to the compressibility of air. Additionally, pneumatic systems may require on-board compressors and a heavy and bulky bank of fluid control valves. Accordingly, pneumatic systems may also be inadequate as artificial skeletal muscles.

Hydraulic systems may include a piston and cylinder combination, similar to a pneumatic system. Hydraulic systems may not be forward and backward driveable for the same reasons stated above in respect of pneumatic systems. Further, hydraulic systems may also require an on-board pump. Accordingly, hydraulic systems may also be inadequate as artificial skeletal muscles.

Impulse servomechanisms may be a viable alternative to the above mentioned actuators, and various embodiments presented may be considered as impulse servomechanisms. Accordingly, concepts relevant to impulse servomechanisms are now introduced.

An impulse, I, between time, $t_1$ and time $t_2$, may be defined as, Eq. (1):

$$\text{Impulse}, I = \int_{t_1}^{t_2} F \cdot dt, \qquad \text{Eq. (1)}$$

where F is a fixed or variable force (N) applied to a mass, M (kg), from time, $t_1$ (s) to time $t_2$ (s).

The impulse, I, applied to the mass, changes its momentum, p, according to Eq. (2):

$$\text{Momentum change}, \Delta p = I \qquad \text{Eq. (2)}$$

Where momentum, $p=M \times v$, and where v (m/s) is the velocity of a mass, M (kg). For the sake of simplicity, it may be assumed that a constant force, F, acts on a constant mass, M, for time $\Delta t$. However, the skilled person would understand that the equations presented apply equally to a variable force. An impulse may produce a change in velocity, $\Delta v$, of the mass, M, wherein the change in velocity may be given as in Eq. (3):

$$\text{Change in velocity of mass}, \Delta v = \frac{F}{M} \cdot dt = \frac{I}{M}. \qquad \text{Eq. (3)}$$

Accordingly, the velocity of a mass may be changed by an amount proportional to the impulse, I, applied to the mass, M.

From the above equations, it may be seen that if the required change in velocity, $\Delta v$, of the mass, M, is known, and a known impulse, I, with respect to time is applied to the mass, then the velocity of the mass with respect to time may be controlled. Various embodiments are capable of using this principle in enabling, among other things, dynamic robots with artificial skeletal muscles. Such robots may also be composed of rotary joints. Accordingly, the skilled person would recognize that a similar analysis in respect of a rotational impulse could result in a limb that has its angular (i.e., rotational) velocity changed by an amount proportional to the rotational impulse applied to it.

In addition to applying an impulse, I, to a mass, M, to change its velocity, v, skeletal muscles, biological or artificial, may also be required to apply an impulse to a limb or set of limbs when there is zero velocity change. This case could be analogous to skeletal muscles applying impulses that overcome forces due to gravity acting on the limbs when a body is standing still. The analysis of a multi-jointed robot may be more involved than expressed above since an impulse applied at a limb, such as, for example, an arm, applies an equal and opposite impulse to the rest of the body, and ultimately to the ground if the robot is standing on the ground. Therefore, limb impulses are interconnected through the body. Nevertheless, the above stated basic principles may still remain.

Most articulated machine systems, such as, for example, robots with artificial skeletal muscles, may be articulated by closed loop angular or linear displacement servomechanisms, or angular or linear velocity servomechanisms. This is in contrast to various embodiments presented, which may be modeled as impulse servomechanisms that position a mass, such as, for example, a limb, at the correct displacement or with the correct velocity. Accordingly, the force produced by an impulse force producing actuator may be independent of the limb position, velocity, and acceleration. This property may be referred to as high forward and backward drivability. This property may also be known as low, negligible or zero bidirectional output impedance.

Low bidirectional output impedance may also be defined as low values of the following three output impedance coefficients: $k_{displ}$ (displacement output impedance); $k_{vel}$ (velocity output impedance); $k_{accel}$ (acceleration output impedance). Suppose an actuator is programmed to exert a demanded force, $F_{dem}$, and the actual force produced by the muscle is $F_{muscle}$. Ideally, for high or perfect forward and backward driveability, $F_{muscle} = F_{dem}$. However, in practice, the following may be the case:

$$F_{muscle} = F_{dem} + k_{displ} \cdot x \qquad 1.$$

where $k_{displ}$ is displacement output impedance in N/m (for a linear force) or N-m/rad (for a rotational moment of force), and x is displacement in meter (for a linear force) or rad (for a rotational moment of force). Zero or negligible displacement output impedance, i.e., $k_{displ} \approx 0$, may imply that force $F_{dem}$ may be capable of being independent of actuator displacement. Accordingly, this may also imply that there may be no resilience in an output shaft of the actuator.

$$F_{muscle} = F_{dem} + k_{vel} \cdot (dx/dt)^n \qquad 2.$$

where $k_{vel}$ is Coulomb friction velocity output impedance in units of (N) or (N-m) for n=0 or fluid viscous friction velocity output impedance in units of (N/(m/s)) or (N-m/(rad/s)) for n=1, or fluid dynamic velocity output impedance in units of $(N/(m/s)^2)$ or $(N-m/(rad/s)^2)$ for n=2, and dx/dt is actuator velocity in (m/s) or (rad/s). Zero or negligible velocity output impedance, i.e., $k_{vel0} \approx 0$, $k_{vel1} \approx 0$ and $k_{vel2} \approx 0$, may imply that force F may be capable of being independent of actuator velocity. Accordingly, there may be no Coulomb, viscous or fluid dynamic losses in the actuator output shaft.

$$F_{muscle} = F_{dem} + k_{accel} \cdot d^2x/dt^2 \qquad 3.$$

where $k_{accel}$ is acceleration output impedance in $(N/(m/s^2))$ or $(N-m/(rad/s^2))$, and $d^2x/dt^2$ is actuator acceleration in $(m/s^2)$ or $(rad/s^2)$. Zero or negligible acceleration output impedance, i.e., $k_{accel} \approx 0$, may imply that force F may be capable of being independent of actuator acceleration. Accordingly, moving elements of the output shaft may be as lightweight as possible.

In summary, low bidirectional output impedance may be defined as low values of the above mentioned output impedance coefficients. Further, one might gain an intuitive understanding of zero bidirectional output impedance by imagining pushing and pulling against an actuator. The result may be that the force felt from the actuator remains constant, equal to $F_{dem}$, whatever is the actuator displacement, velocity or acceleration.

Various embodiments are also modeled on biological skeletal muscle in that biological skeletal muscles may not be able to exert pushing forces, but may be able to exert pulling forces due to contraction. Stated differently, biological skeletal muscles may be able to contract by themselves, but may not be able to extend by themselves. When biological skeletal muscles seem to extend, this is due to a partner skeletal muscle contracting on the opposite side of the limb. Accordingly, skeletal muscles may work in pairs and may be known as agonistic and antagonistic muscles. The terms "agonistic" and "antagonistic" are explained later.

Since biological skeletal muscles may be considered as impulse servomechanisms, the muscles may be capable of applying not only zero force, but also variable and controllable forces up to its maximum force in such a way that this controllable force is unaffected by, and independent of, the position, velocity or acceleration of the limb. Stated differently, the muscle may possess negligible bidirectional output impedance.

Various embodiments are capable of providing articulation in machine systems, such as, for example, artificial skeletal muscles. Accordingly, information relevant to the working of skeletal muscles are now presented.

Muscles are, in general, manufactured from five compounds: (i) myosin, which forms a thick filament, (ii) actin, which may be the main constituent of a thin filament, (iii) tropomyosin, which is used in the thin filament, (iv) troponin, which is also used in the thin filament, and (v) titin, also known as connectin, which is a rope-like long chain molecule that connects the thick and thin filaments together.

FIG. 1 depicts an articulated myosin structure 100. The articulated myosin structure 100 includes a single myosin filament 102, a myosin head 104a or 104b at each end of the myosin filament 102, each myosin head 104a or 104b connected to the myosin filament 102 by structures that may resemble hinges 106, with a 2-degree-of-freedom articulated walking mechanism 108a or 108b at each end of the myosin filament 102. Each 2-degree-of-freedom articulated walking mechanism may include a myosin head and its hinges. The articulated myosin structure 100 may also be symmetric about a central axis 110.

Figure 2:
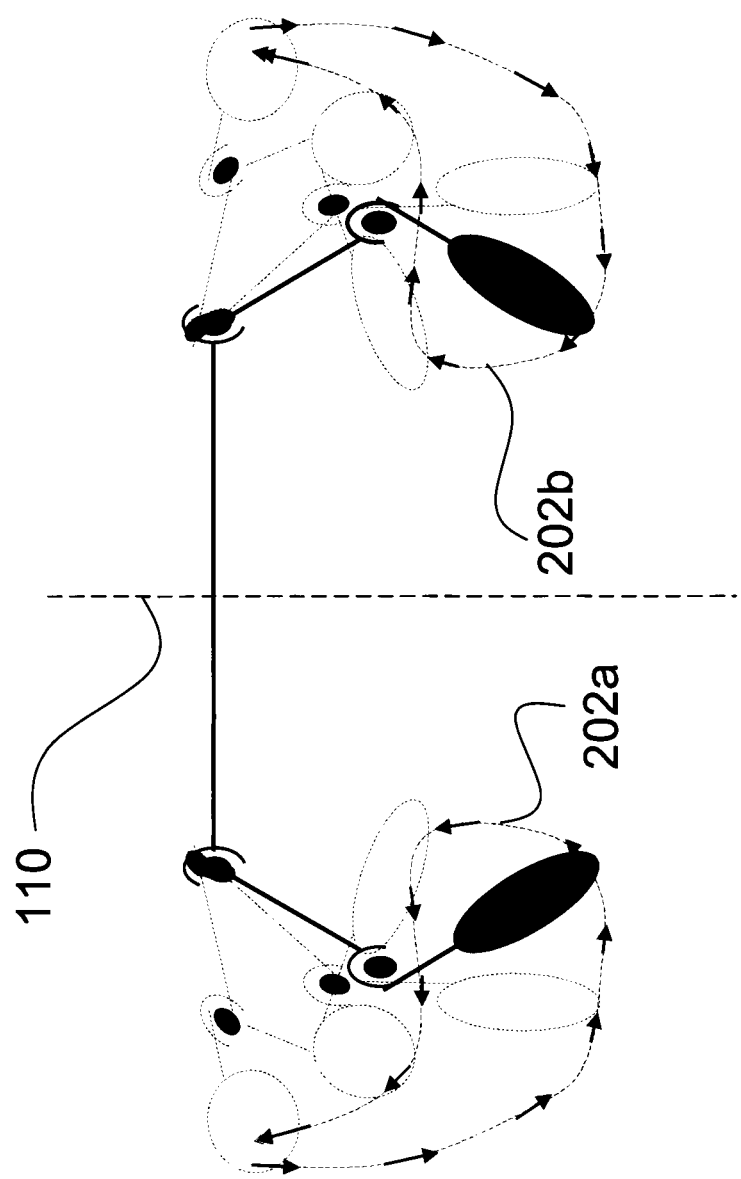
FIG. 2 illustrates a trajectory of a myosin head when a myosin structure articulates.

FIG. 2 illustrates the trajectory of each myosin head when the myosin structure of FIG. 1 articulates. Each 2-degree-of-freedom articulated walking mechanism may be capable of moving in a trajectory 202a, 202b similar to a foot connected to a leg. However, as depicted in FIG. 2, the walking mechanisms may articulate in opposite directions in a mirror-image, as if walking away from each other. In FIG. 2, articulation trajectory 202a is a mirror-image of articulation trajectory 202b, where the axis of symmetry may be the central axis 110.

Figure 3:
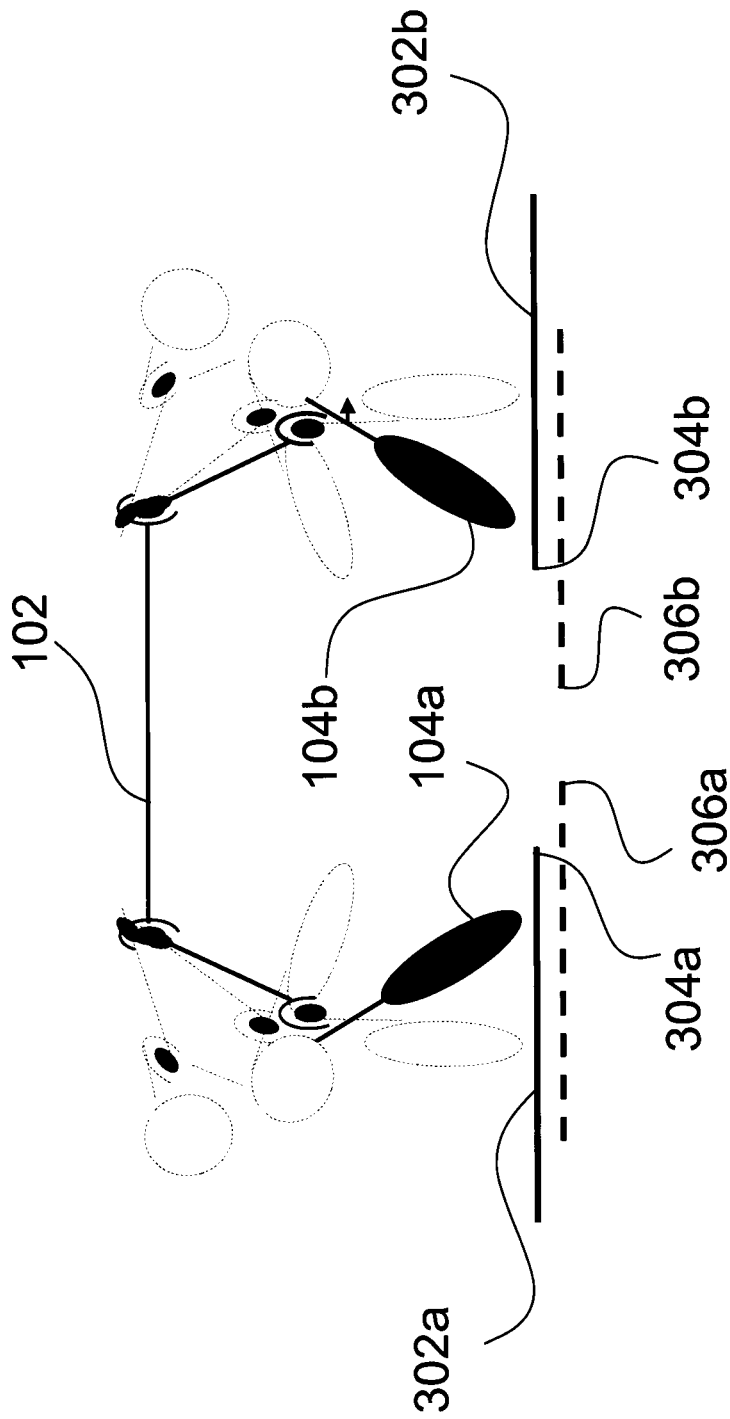
FIG. 3 illustrates articulating myosin heads capable of producing a contractile mechanism.

FIG. 3 illustrates articulating myosin heads capable of producing a contractile mechanism. The articulating myosin heads 104a, 104b, being connected together by at least the myosin filament 102, and articulating in opposite mirror-image directions as in FIG. 2, are capable of bringing together two separated parts called thin filaments 302a, 302b, that largely include actin, but have an electrical-chemical-mechanical mechanism that utilizes tropomyosin and troponin to create force. The thin filaments 302a, 302b, are pulled together from their starting positions 304a, 304b as the myosin heads articulate to a final position 306a, 306b. This pulling together of thin filaments 302a, 302b may form the basis of a contractile mechanism. It may be noted that the articulating myosin heads 104a, 104b may still produce a contractile force even in the case when the thin filaments 302a, 302b, are inhibited from movement. In this case, the articulating myosin heads 104a, 104b seem to slip on the surface of the thin filaments 302a, 302b, but may still exert a force. Accordingly, a continuous force may be exerted as the myosin heads selectively release their grip on the thin filaments since there may be many such articulating myosin heads acting at random times.

Figure 4:
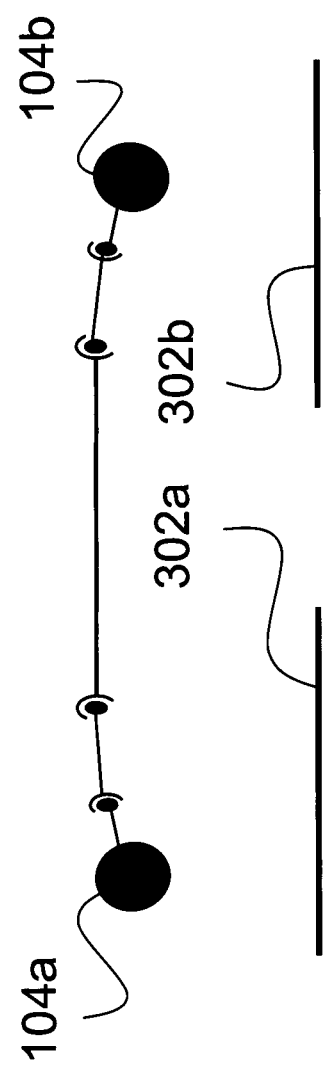
FIG. 4 illustrates a physical disassociation between myosin heads and thin filaments.

FIG. 4 illustrates a physical disassociation between the myosin heads and the thin filaments. The articulating mechanisms may be capable of articulation when excited by nerves from the brain, and the speed of articulation may be proportional to the nervous excitation. The nervous excitation of muscle tissue involves electro-chemical-physical-mechanical mechanisms. However, the mechanical properties are described thus far. When there is no nervous excitation, the myosin heads 104a, 104b may cease to articulate and retract clear from the thin filaments 302a, 302b.

The complete physical disassociation between the myosin heads and the thin filaments, as depicted in FIG. 4, is a feature of biological skeletal muscle tissue. This implies that skeletal muscle tissue may allow, if necessary, free unhindered motion of limbs. Accordingly, there may be no feeling of friction or of mass connected to the limp limb.

The basic micro-mechanism of biological skeletal muscles, as illustrated in the above Figures, are capable of being assembled en-masse to form a complete skeletal muscle. Consequently, many articulated myosin structures of various lengths may be stacked together into a bundle to form a thick filament.

Figure 5:
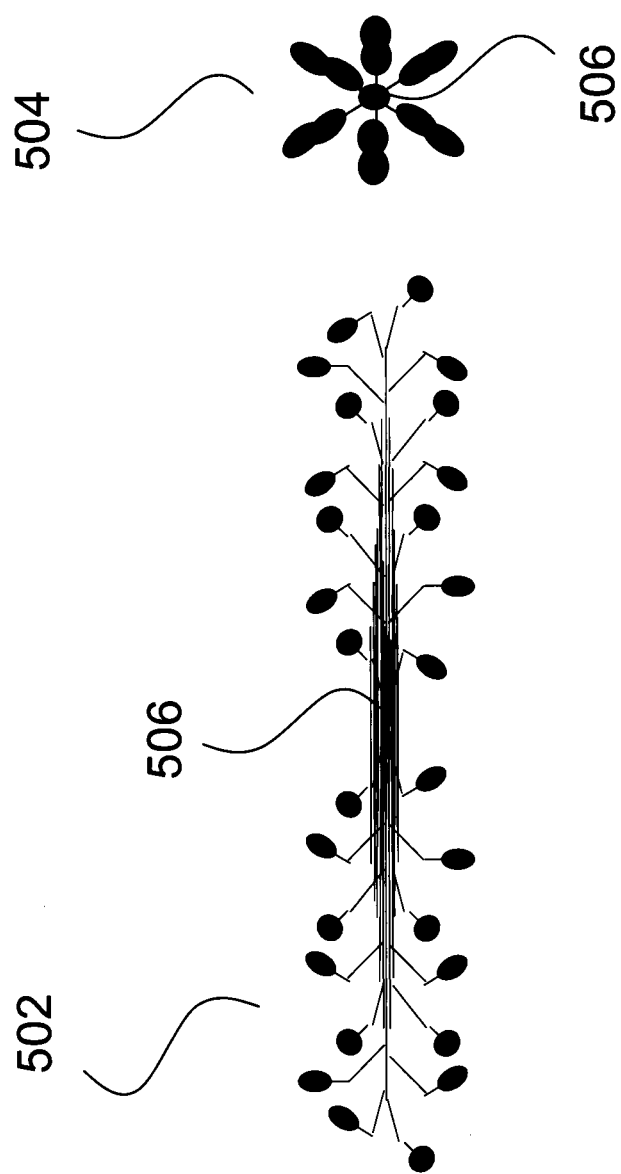
FIG. 5 illustrates side and end views of a thick filament including a plurality of articulated myosin structures of FIG. 1.

FIG. 5 illustrates side and end views of a thick filament including a plurality of articulated myosin structures of FIG.

Figure 6:
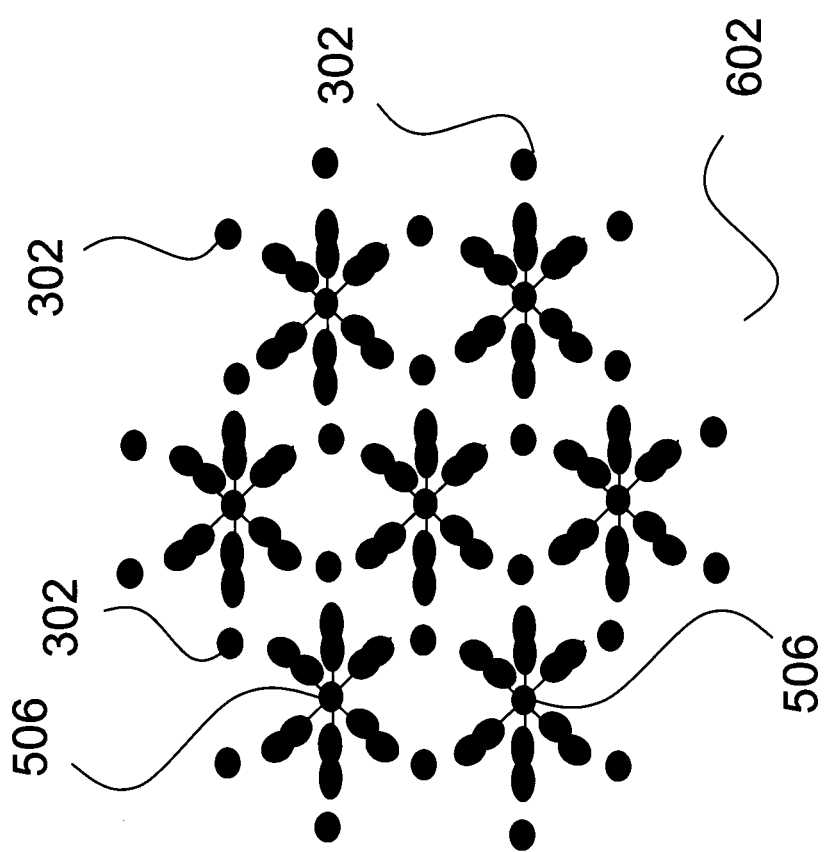
FIG. 6 illustrates a cross-sectional view showing thick and thin filaments packed in a hexagonal arrangement.

1. Side view 502 shows a thick filament 506 that may be formed from a bundle of articulated myosin structures of varying lengths. End view 504 shows myosin heads of the thick filament 506 that may be arranged into a hexagonal format. A possible reason for this may be because the thick filaments 506 may form a 3-dimensional nested hexagonal honeycomb arrangement that matches with the thin filaments 302 which may also be arranged in a hexagonal arrangement. The relative arrangement of thick filaments 506 in respect of thin filaments 302 is illustrated in FIG. 6, which depicts an end view 602 showing thick filaments 506 and thin filaments 302 packed in a hexagonal arrangement.

Figure 7:
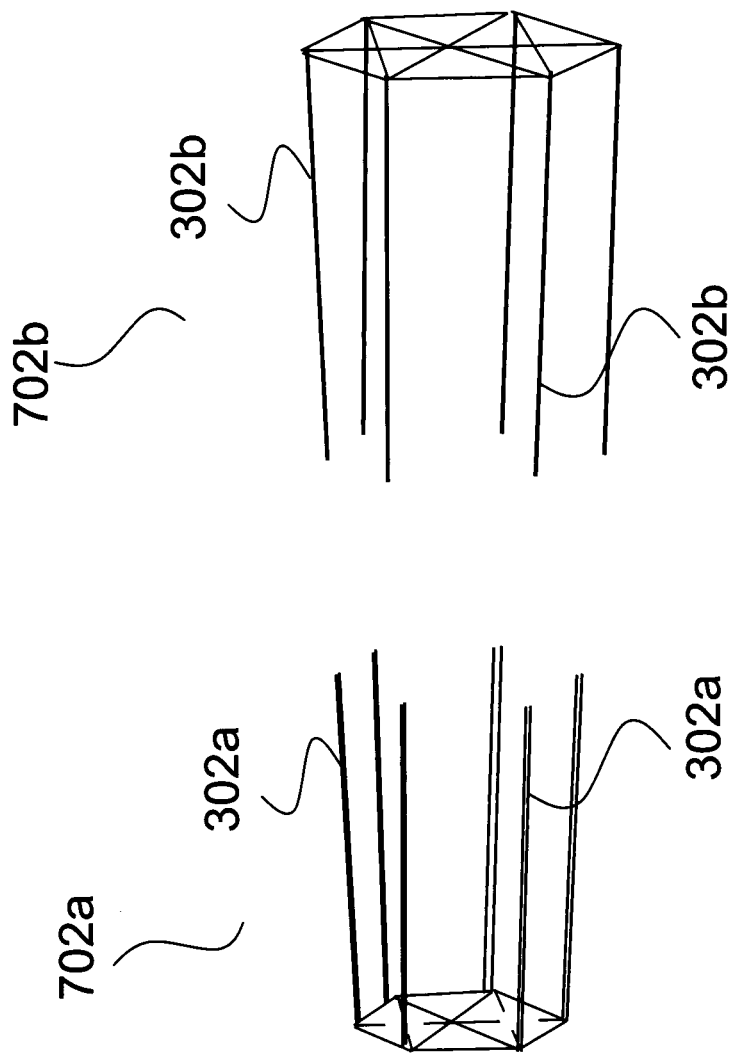
FIG. 7 illustrates the arrangement of thin filaments arranged in opposing structures that resemble "wire cups"

FIG. 7 illustrates, in 3-dimensional perspective view, the arrangement of thin filaments arranged as structures 702a, 702b. Each structure, such as, 702a, corresponds to a plurality of thin filaments 302a being arranged in the hexagonal format of thin filament 302 in FIG. 6. Similarly, a plurality of thin filaments 302b may be arranged in a similar hexagonal format to form structure 702b. The result of such an arrangement may result in a structure that resembles opposing thin filament "wire cups" 702a, 702b. One thick filament 506 may be placed within the pair of opposing thin filament wire cups of FIG. 7. This placement of a thick filament 506 within a pair of thin filament wire cups is also consistent with the arrangement of FIG. 6. The result of this is capable of forming the basis of a single muscle contractile structure called a sarcomere.

Figure 8:
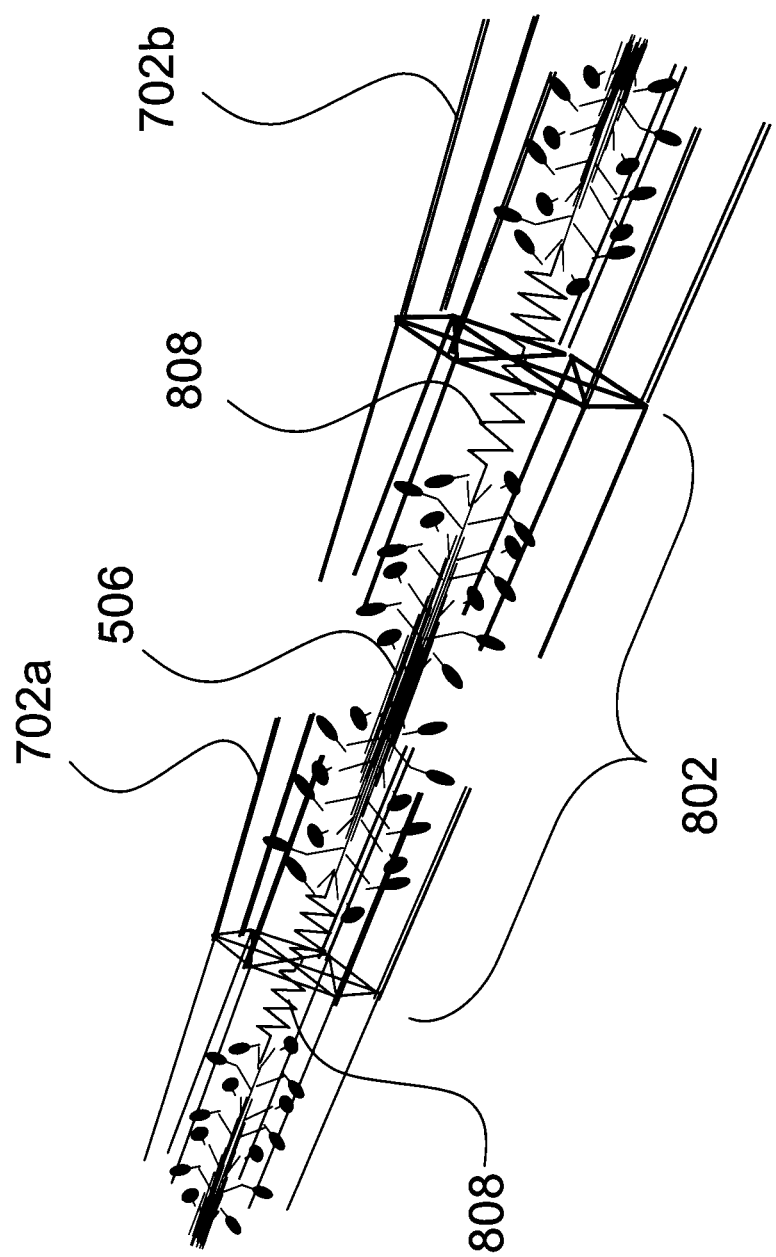
FIG. 8 illustrates a plurality of sarcomeres that are connected together.

FIG. 8 illustrates a 3-dimensional perspective view of a plurality of sarcomeres that are connected together. Each sarcomere 802 includes a thick filament 506 contained within actin thin filament "wire cups" 702a, 702b the thick filament 506 connected to each end of the "wire cups" 702a, 702b via a resilient structure 808, such as, for example, elastic proteins, including titin or the like. Each sarcomere may be in the range from about 1.4 µm to about 2.8 µm, e.g. in the range from about 1.6 µm to about 2.6 µm, e.g. in the range from about 1.8 µm to about 2.4 µm, e.g. in the range from about 2.0 µm to about 2.2 µm, in length, so a typical bicep muscle of 200 mm in length may include approximately 100,000 sarcomeres strung together in a continuous line.

Figure 9:
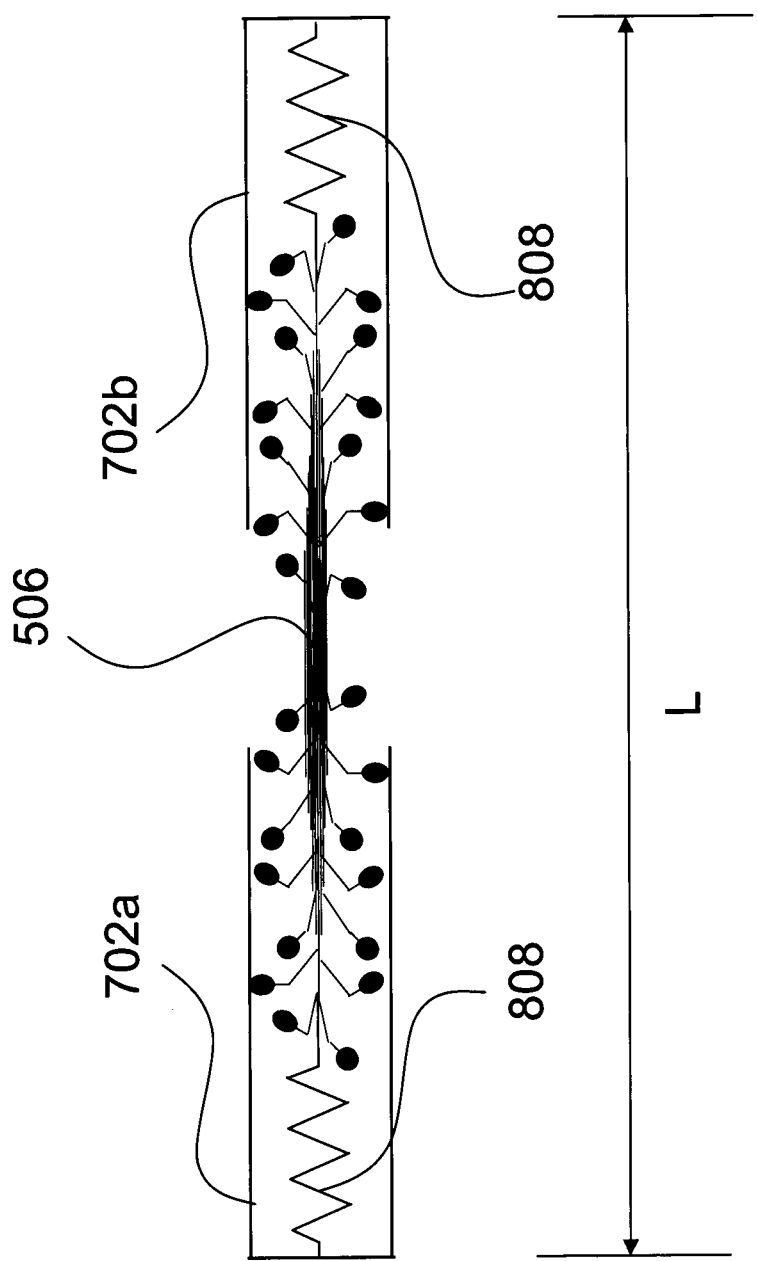
FIG. 9 illustrates the 2-dimensional arrangement of a sarcomere.

The contractile action of a skeletal muscle is now explained by using a 2-dimensional arrangement of a sarcomere, which is illustrated in FIG. 9. A sarcomere may be the range from about 1.4 µm to about 2.8 µm, e.g. in the range from about 1.6 µm to about 2.6 µm, e.g. in the range from about 1.8 µm to about 2.4 µm, e.g. in the range from about 2.0 µm to about 2.2 µm, in length L. The sarcomere includes three items: (i) the already described thick filament 506 with a plurality of walking myosin heads, (ii) the already described thin filaments illustrated as a pair of opposing "wire cups" 702a, 702b, and (iii) a centralizing resilient structure 808, such as, for example, tensile elastic ropes made from elastic proteins, including titin or the like. The probable purpose of the centralizing resilient structure 808 may be two-fold. The first may be to keep the thick filament 506 centralised with respect to the thin filament cups 702a, 702b. The second probable purpose may be to stop the sarcomere from being pulled apart. The resilient structure 808 also appears to be non-linear, in that its restoring force is low except until it is at the end of its travel. A travel may include the resilient structure 808 being contracted, or a travel may include the resilient structure 808 being extended. A restoring force may include a force acting against a contraction when the resilient structure 808 is being contracted, or it may include a force acting against an extension when the resilient structure 808 is being extended. Accordingly, it may be implied that the resilient structure 808 acts in a manner that could be similar to an uncoiling tethered rope.

Figure 10:
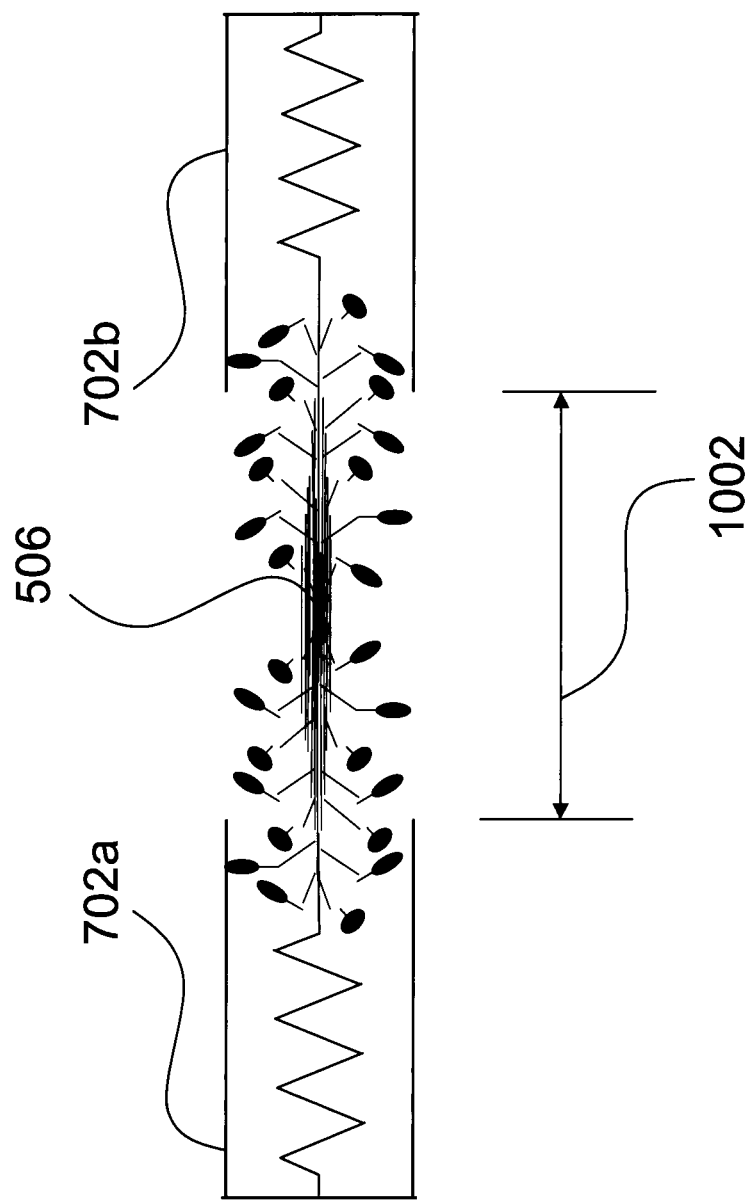
FIG. 10 illustrates a sarcomere in its fully extended state.

FIG. 10 illustrates a sarcomere in its fully extended state. This may occur, for example, in the bicep arm muscle when the arm is straightened by contracting the tricep muscle. Further, as illustrated in FIG. 3, articulated myosin heads of the sarcomere may be capable of dragging the thin filaments together and not apart since the sarcomere unit may be considered a unidirectional force generator. The sarcomere in its fully extended state may result in a large gap between the thin filament wire cups 702a, 702b. This gap may be referred to as a H-zone 1002.

Figure 11:
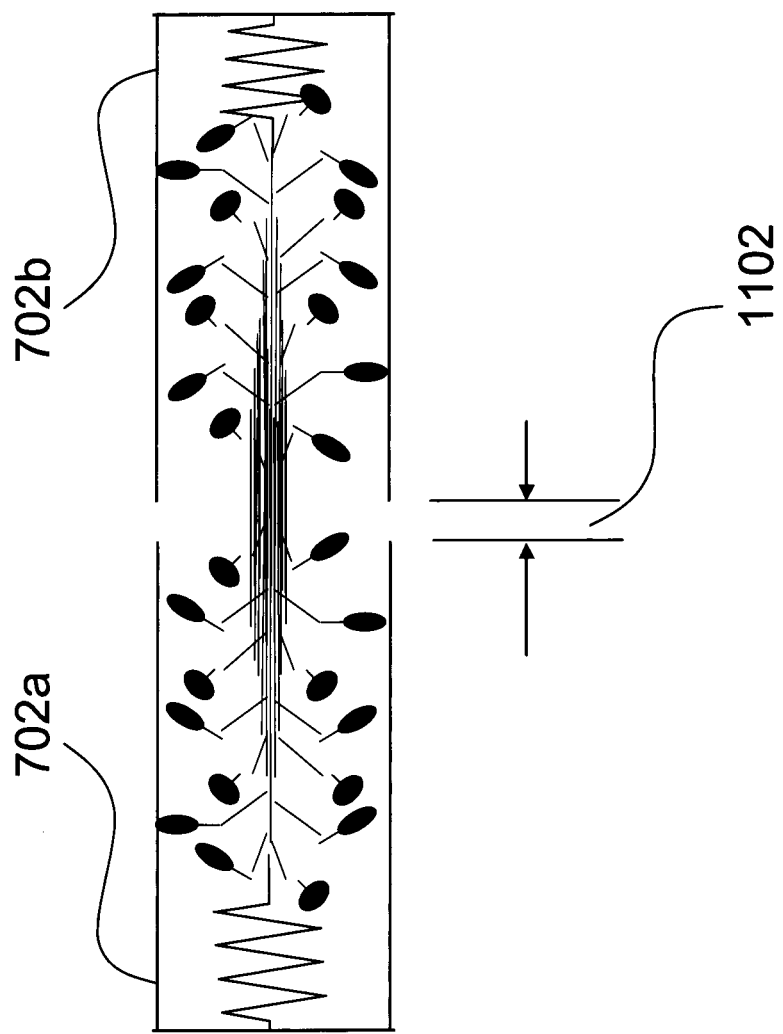
FIG. 11 illustrates a sarcomere in its fully contracted state.

FIG. 11 illustrates a sarcomere in its fully contracted state. This may occur if the articulated myosin heads of the sarcomere of FIG. 10 are excited or activated. Accordingly, when this occurs, the thin filament wire cups 702a, 702b may be pulled together and the H-zone now decreases to a small gap 1102. Typically, the sarcomere may be capable of extending and contracting +/−15% from its mid-range length.

Figure 12:
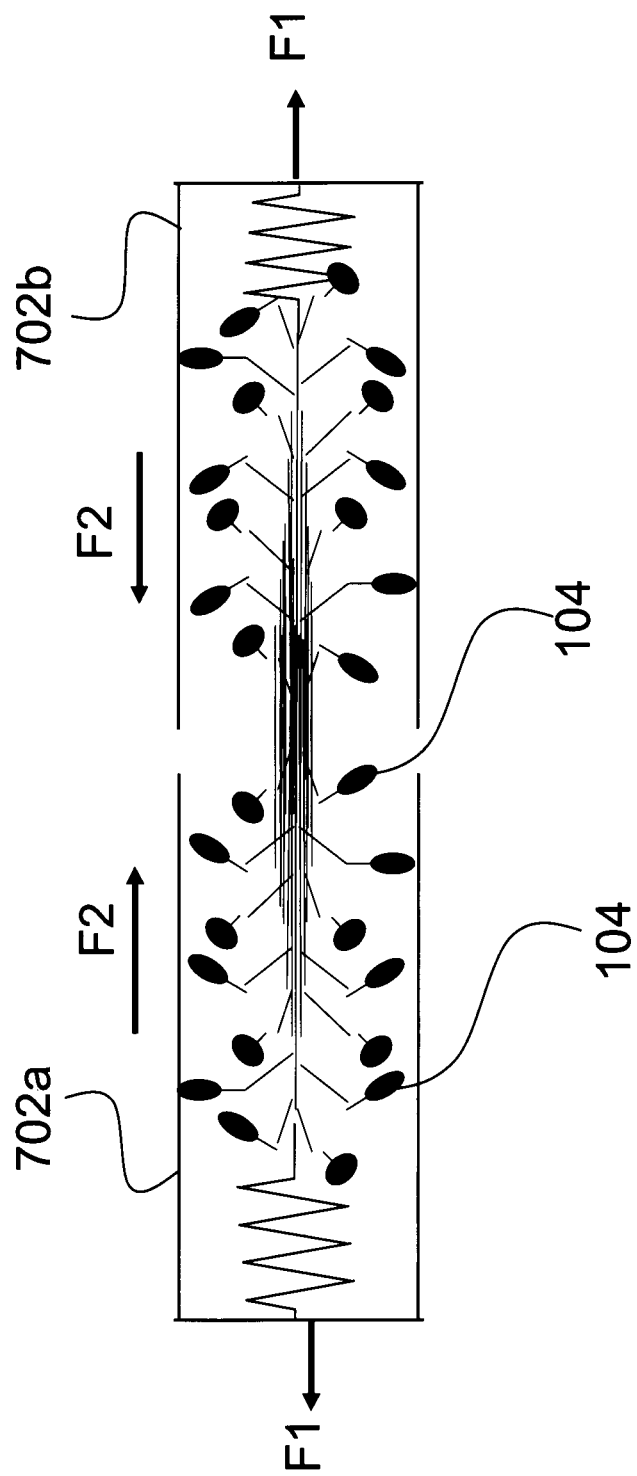
FIG. 12 illustrates a sarcomere resisting an external tensile load by exerting an equal and opposite contractile force.

FIG. 12 illustrates a sarcomere resisting an external tensile load F1 by exerting an equal and opposite contractile force F2. Accordingly, the magnitude of F1 is equal to the magnitude of F2. The balance of forces may enable the sarcomere to allow the relative free sliding of the thin filaments wire cups 702a, 702b over the thick filament myosin heads 104 whilst still exerting a constant force F2. This implies that the skeletal muscle tissue may be perfectly forward and backward driveable, and thus is capable of being a force producing device. This may also imply that the myosin heads 104 simply "slip" over the thin filaments 702a, 702b. Further, as described above, the sarcomere muscle structure is capable of applying the contractile force F2 independent of the position and velocity of contraction. Accordingly, the contractile action of biological skeletal muscles may enable the high forward and backward driveability of skeletal muscle tissue, which may additionally possess low inertia and low mass.

Figure 13:
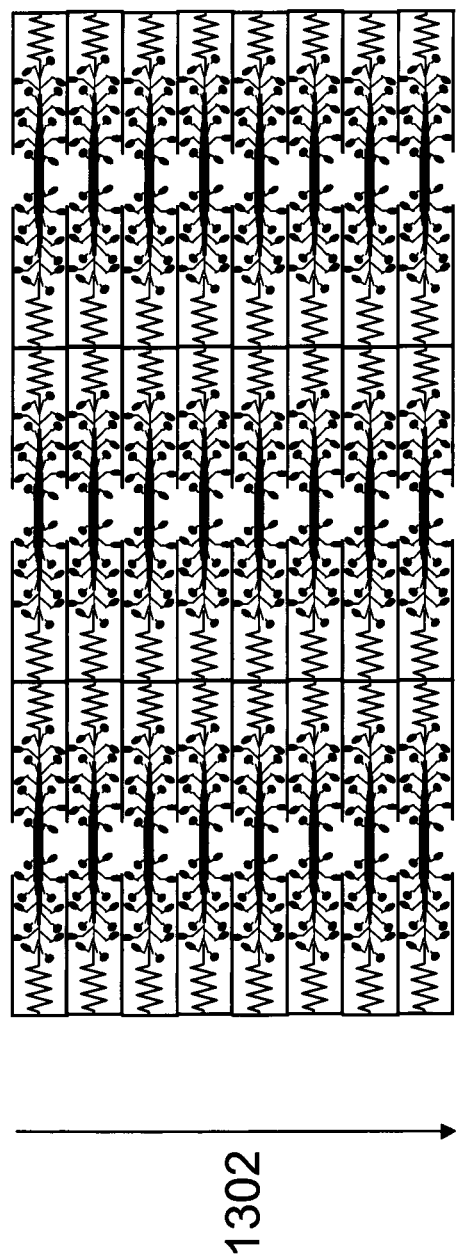
FIG. 13 illustrates a complete skeletal muscle that may be orderly assembled from many sarcomeres placed in parallel and series.

FIG. 13 illustrates a complete skeletal muscle that may be orderly assembled from many sarcomeres placed in parallel and series. Adding sarcomeres in parallel 1302 may increase contractile force, whilst adding sarcomeres in series 1304 may increase the contraction length and also thus may increase the mechanical power output of the muscle.

Since, skeletal muscles may contract themselves, but not extend themselves, articulation of limbs may be provided by skeletal muscles working in concert with each other. Accordingly, information relevant to force-producing contractile muscles working in pairs to articulate limbs are presented next.

Figure 14:
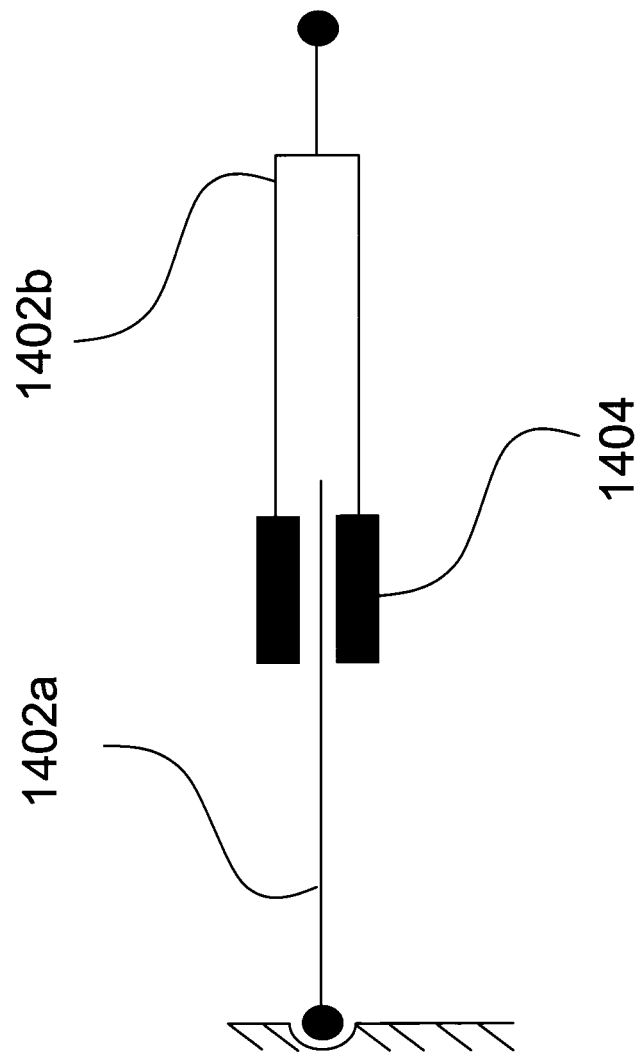
FIG. 14 illustrates a simplified muscle in a fully extended position.

FIG. 14 illustrates a simplified muscle in a fully extended position. In this embodiment, the mass, such as, for example, a limb, is shown as a sliding telescopic system 1402a, 1402b with a force-producing contractile element 1404 that applies a variable and controllable force that is exerted to contract the telescopic system so that structure 1402b is brought towards structure 1402a. The skilled person would recognize that the simplified representation of the muscle and limb of FIG. 14 may also be realized as a linear electromagnetic telescopic device being energised for example from a controllable current source, among other things.

Figure 15:
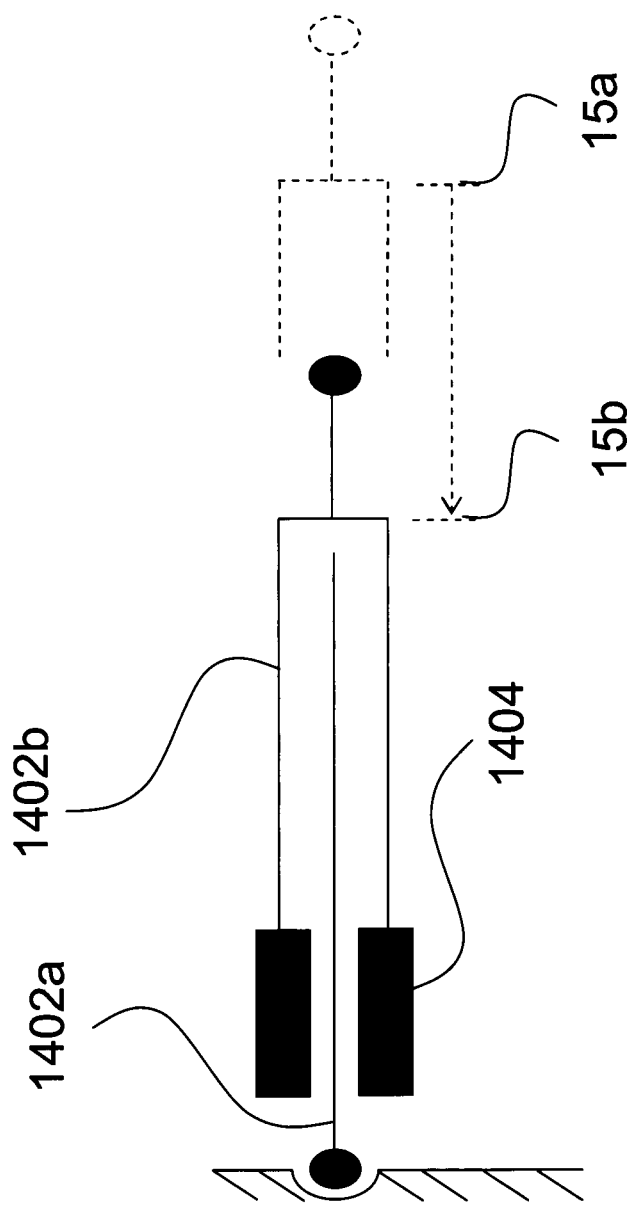
FIG. 15 illustrates a simplified muscle in a fully contracted position.

FIG. 15 illustrates the simplified muscle in a fully contracted position. The contractile force exerted by the force-producing contractile element 1404 on the sliding telescopic system moves structure 1402b towards structure 1402a, thus displacing sliding telescopic system from an original position 15a to a new position 15b.

Whilst the simplified representations of FIGS. 14 and 15 may be highly forward and backward driveable, the mechanical power-to-weight ratio of the simplified representations may be too low. As stated previously, achieving high mechanical power output from an electromagnetic device may require an electric motor running at high speed delivering mechanical power to a reduction gearbox. Further, as previously stated, muscles may not be capable of applying an extending force by themselves. Accordingly, muscles are enabled to extend by another muscle contracting on the other side of the limb.

Figure 16:
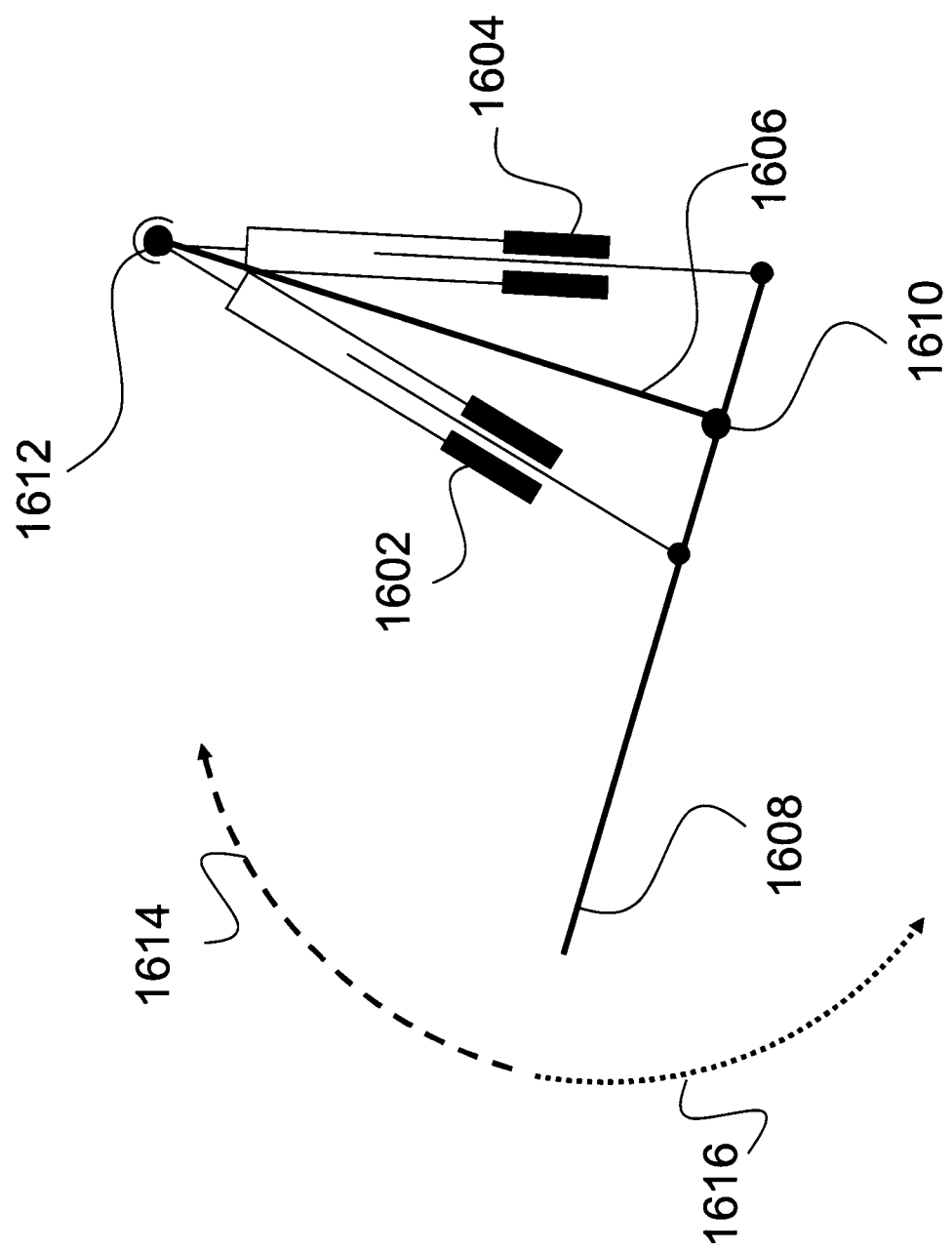
FIG. 16 illustrates a representation of a human forearm and upper arm in its mid-range position.

FIG. 16 illustrates a representation of a human forearm and upper arm in its mid-range position. This representation includes a flexor muscle 1602, which in this context may be a bicep muscle, an extensor muscle 1604, which in this context may be a tricep muscle. Each of the muscles is disposed on opposite sides of an upper arm 1606. The upper arm 1606 may be connected to a forearm 1608 by at least an elbow joint 1610, and the extensor muscle 1604 and flexor muscle 1602 may be connected to each other at a shoulder joint 1612. The bicep and tricep muscles work in pairs to either flex 1614 the forearm 1608 towards the upper arm 1606, or to extend 1616 the forearm 1608 away from the upper arm 1606.

Figure 17:
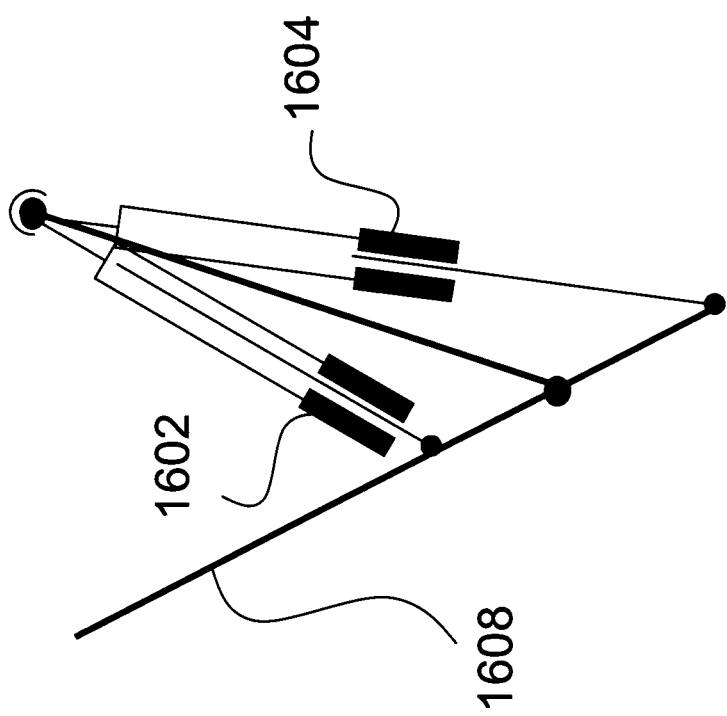
FIG. 17 illustrates a representation of a flexed forearm due to bicep muscle contraction.

FIG. 17 illustrates a representation of a flexed forearm. The muscle capable of flexing the forearm is the contracted flexor muscle 1602, whilst the extensor muscle 1604 relaxes so the forearm 1608 may be flexed and, in turn, the extensor muscle 1604 becomes extended.

Figure 18:
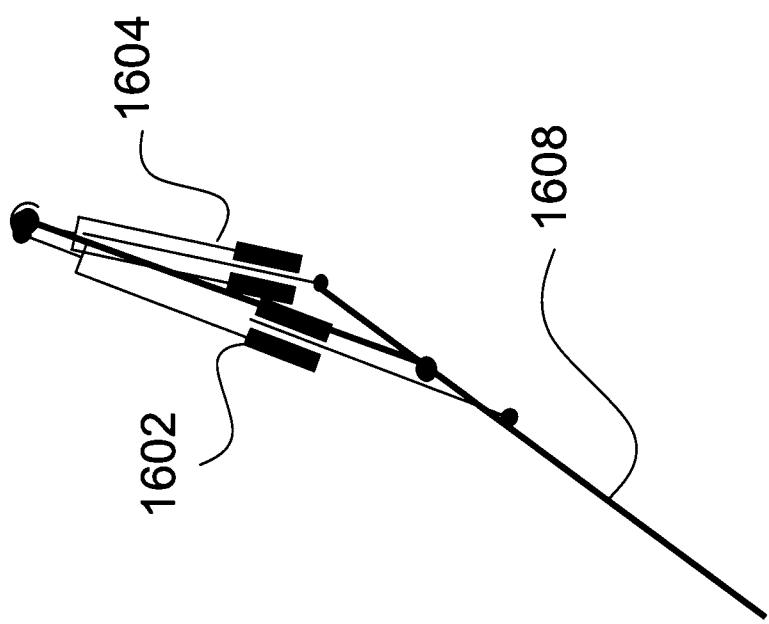
FIG. 18 illustrates a representation of an extended forearm due to tricep muscle contraction.

FIG. 18 illustrates a representation of an extended forearm. In this illustration, the flexor muscle 1602 is extended and the extensor muscle 1604 is contracted to extend the forearm 1608. Although the above illustrations are directed at the representation of a forearm, the skilled person would understand that the above described working principle is typical of most skeletal muscles in the body and typifies skeletal muscles existing in pairs, i.e., one muscle may be used to flex a limb and the other may be used to extend the limb, thus enabling bidirectional motion.

The above-described FIGS. 16 to 18 now allow the introduction of three more terms: "reciprocal inhibition", "agonistic muscle", and "antagonistic muscle".

When the forearm flexes, as in FIG. 17, both bicep (flexor) and tricep (extensor) muscles may be activated, but there may be no movement until the tricep relaxes and allows the bicep to overpower the tricep. Accordingly, the flexing bicep muscle may send a signal to its opposing muscle, the extending tricep muscle, to allow flexing to occur by reducing the contractile force in the tricep muscle. The process is known as "reciprocal inhibition". The inhibition of the tricep muscle may be greatest at the start of the flexing motion and the least at the end of the flexing motion. Stated differently, the contractile force of the tricep may be lowest at the beginning of flexing and greatest at the end of flexing. Similarly, the bicep may work inversely by being the most strongly activated at the beginning of the flexing motion and decreasing near the end of the flexing motion. This effect may be considered analogous to velocity feedback that is used in engineered control systems.

The bicep, which may overpower the tricep muscle to create flexing, may be referred to as the "agonistic" muscle because it is the muscle undergoing the greater stress or agony. Conversely, the tricep muscle, which is moderating the flexing motion to ensure that the forearm does not slam into the upper arm and cause damage, is called the "antagonistic" muscle since it is the muscle "that fights against" the contracting bicep muscle.

When the forearm extends, the roles of the bicep and tricep muscles may be reversed. In this case, the more highly activated tricep muscle may become the agonistic muscle because it has to overpower, using reciprocal inhibition, the bicep muscle which now may become the antagonistic muscle.

The above description of biological skeletal muscles and impulse servomechanisms may now provide insight into various embodiments.

Various embodiments provide an apparatus for simulating an impulse force exerted by a skeletal muscle, the apparatus including a mass and an actuator, the actuator being adapted to exert a unidirectional force on the mass, the apparatus being configured in use to selectively couple together the mass and the actuator so that the unidirectional force exerted on the mass by the actuator emulates the impulse force.

Figure 19:
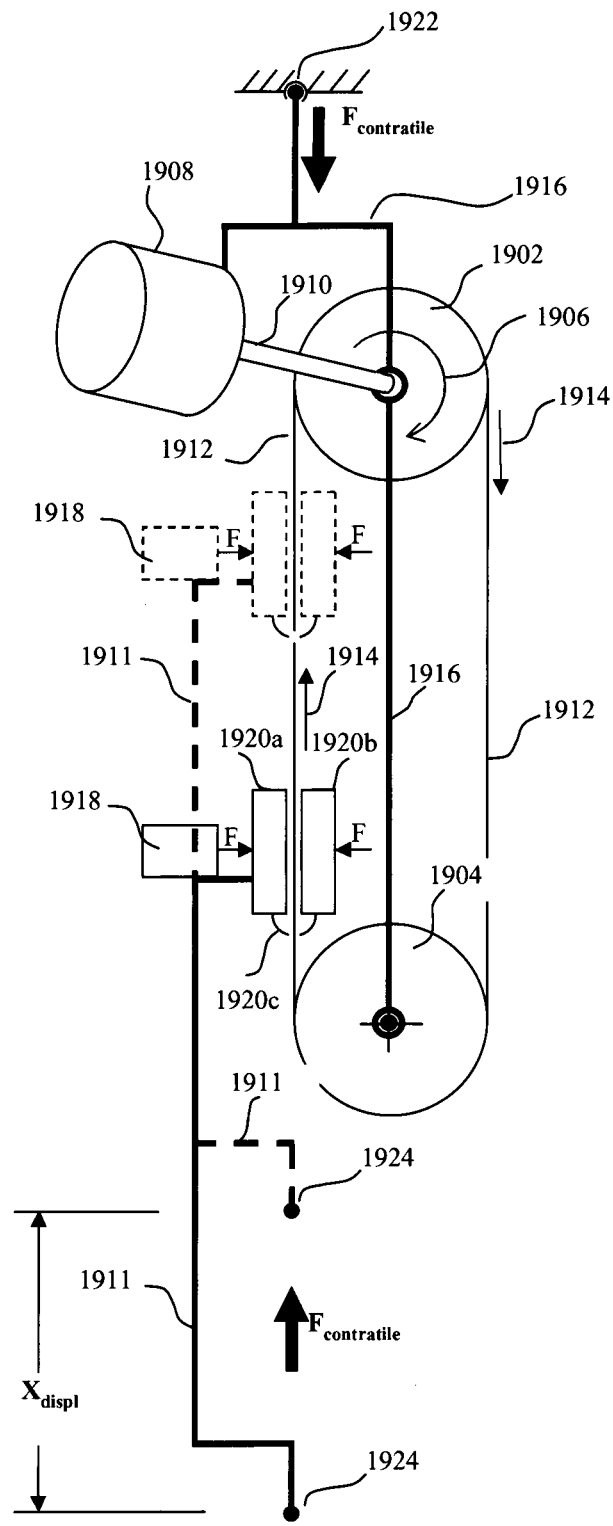
FIG. 19 illustrates a rectilinear embodiment of an apparatus for simulating an impulse force exerted by a skeletal muscle.

FIG. 19 illustrates a rectilinear embodiment of the above apparatus. The rectilinear embodiment produces a unidirectional force that emulates a straight line contractile force. In an embodiment, the actuator includes a motor 1908 and/or a driving shaft 1910. In an embodiment, the actuator includes a continuously moving structure, such as, for example, a belt and pulley system. Such an embodiment may include wheels 1902 and 1904 that lie on the same plane connected to each other by a moving belt 1912. In an embodiment, wheel 1902 may be driven in a clockwise direction 1906 by the motor 1908 and the driving shaft 1910. In an embodiment, the continuously moving structure may have a variable speed. In an embodiment, the mass may include a telescopic slider 1911.

In an embodiment, the wheel 1904 may be a free running wheel, but it equally could be driven from a second motor or from the motor 1908. In an embodiment, the motor 1908 may include a multi-train gearbox.

In an embodiment, the moving belt 1912, such as, for example, a steel band, a conveyor band or the like, is driven by the wheel 1902, and moves in one direction only, i.e., it is unidirectional. Accordingly, in such an embodiment, the direction of the motion 1914 of the moving belt 1912 does not change direction or reciprocate.

In an embodiment, the moving belt 1912 may be capable of running with zero or minimum slip on the peripheral circumference of the wheels 1902 and 1904 which move in only a unidirectional motion, such as, for example, a clockwise direction 1906. In an embodiment, slip between the wheel 1902 and the moving belt 1912 may be avoided by the surfaces of the moving belt 1912 and the wheels 1902 and/or 1904 having cooperating features which in use engage together, such as, for example, regularly spaced holes punched on the periphery of the surface of the moving belt 1912 into which may penetrate raised domes located on the periphery of the wheel 1902.

In an embodiment, the actuator includes a frame 1916 that may be used to separate the wheels 1902 and 1904 such that the surface of the moving belt 1912 is kept taut. In an embodiment, a third free-wheel may be disposed on the free side of the moving belt 1912 to push inwards or outwards the moving belt 1912 to make taut the surface of the moving belt 1912. In an embodiment, the wheel 1902 and/or the wheel 1904 are translatable, i.e., the wheel is capable of translating or moving in a 3-dimensional plane, to tauten the moving belt 1912.

In an embodiment, the apparatus further includes a clamping mechanism 1918. The clamping mechanism 1918 may be configured in use to selectively couple together the actuator and the mass using a clamping force, F.

In an embodiment, the clamping mechanism includes an electromagnetic eddy current damper, the damper being configured in use to apply the clamping force, F. In an embodiment, the actuator 1908, 1910, 1902, 1904, 1912, 1916 includes the clamping mechanism 1918. In an embodiment, the mass 1911 may include the clamping mechanism 1918. In an another embodiment, the mass 1911 may be coupled to the clamping mechanism 1918.

In an embodiment, the clamping mechanism may further include a pair of friction producing elements, such as, for example, opposing friction pads 1920*a* and 1920*b*. In an embodiment, the actuator 1908, 1910, 1902, 1904, 1912, 1916 includes the clamping mechanism 1918, 1920*a*, 1920*b*. In an embodiment, the mass 1911 may include the clamping mechanism 1918, 1920*a*, 1920*b*. In an another embodiment, the mass 1911 may be coupled to the clamping mechanism 1918, 1920*a*, 1920*b*.

In an embodiment, at least a portion of the actuator, such as, for example, the moving belt 1912, is positioned within the friction producing elements of the clamping mechanism 1918, 1920*a*, 1920*b*, such as, for example, between the pair of friction pads 1920*a*, 1920*b*.

In an embodiment, the friction pads 1920*a* and 1920*b* may move towards each other to enable clamping of the moving belt 1912 with a clamping force, F. The friction pads may be clamped against the moving belt 1912 by a variety of structures, such as, for example, mechanical, magnetic, or electric field structures.

In various embodiments, the clamping mechanism, such as for example, the friction pads 1920*a*, 1920*b*, couple the mass 1911 with at least a part of the actuator, such as, for example, the moving belt 1912, for a selected period of time, such as, between time $t_1$ and $t_2$ in Eq. 1. When the desired impulse I is generated, the clamping mechanism may then decouple the mass from the actuator. Accordingly, the mass and the actuator may be selectively coupled in such a manner.

In an embodiment, the clamping force F may be reduced to zero such that there is no contact between the friction pads 1920*a*, 1920*b* and the moving belt 1912, thus mimicking or emulating FIG. 4 wherein the myosin heads 104 are completely retracted away.

In an embodiment, the friction pads 1920*a* and 1920*b* may be linked together with a link 1920*c* that inhibits relative movement between each friction pad in a direction parallel to direction of motion 1914 of the moving belt 1912. However, the clamping mechanism, such as, for example, the friction pads 1920*a*, 1920*b*, may be allowed free movement in the direction of the clamping force, F. The skilled person would recognize that in an embodiment, the direction of the clamping force F is perpendicular to the direction of motion 1914 of the moving belt 1912.

In the embodiment of FIG. 19, the mass which includes the telescopic slider 1911 is shown in the fully extended state with full drawn lines and in the fully contracted state with broken drawn lines. In an embodiment, the actuator exerts a contractile force $F_{contractile}$ between two points 1922 and 1924 when the mass 1911 is selectively coupled to at least a portion of the actuator, such as for example, the moving belt 1912. In an embodiment, the two points 1922 and 1924 may be mounted on the frame 1916 and the mass (telescopic slider) 1911, respectively.

In an embodiment, the contractile force $F_{contractile}$, which emulates an impulse force exerted by a skeletal muscle, may be extracted from the friction pads 1920*a*, 1920*b*, whereas the moving belt 1912 may provide the source from which is tapped the impulse force.

In an embodiment, the contractile force $F_{contractile}$ extracted from the friction pads 1920*a*, 1920*b* may be varied from zero up to the maximum force available from the moving belt 1912, wherein the maximum force is equal to $2F\mu_{kin}$, where, $\mu_{kin}$ is the kinetic friction coefficient between a friction pad 1920*a* or 1920*b* and surface of the moving belt 1912.

The speed of the unidirectional moving surface 1912 may never be allowed to drop less than the contraction speed of the limb or machine element, to which are connected the friction pads 1920, 1920*b*, for two reasons which are: (i) the friction pad contractile force may always be in the contraction direction if this condition is satisfied, (on the contrary, if the moving surface speed may be allowed to drop less than the contraction speed of the limb then the contractile force may be manifested as a negative contractile force, namely an expansile force, and thus the modus operandi of the artificial muscle may be destroyed and (ii) the friction pads 1920*a*, 1920*b* may always be slipping and thus the coefficient of friction will be the coefficient of kinetic friction which thus may be considered a constant value with the consequence that the contractile force $F_{contractile}$ provided by the friction pads 1920*a*, 1920*b* may be dependent on the above mentioned kinetic friction coefficient. Hence the contractile force $F_{contractile}$ may be directly proportional to the clamping force F as described above. Accordingly, in an embodiment, the clamping mechanism may be configured in use to apply a variable clamping force.

In addition, the contractile force $F_{contractile}$ may be controlled by controlling the clamping force F. Slip occurring between the friction pads 1920*a*, 1920*b* and the moving belt 1912 implies there may be a waste of power manifested as heat dissipated between the friction pads and the moving belt. Accordingly, in an embodiment, the apparatus further includes a control system to control the variable clamping force to reduce slippage between the friction pads and the moving belt and to minimize power loss.

In an embodiment, the speed at which the contractile force $F_{contractile}$ is generated may be dependent on the speed at which the clamping mechanism, such as, for example, friction pads 1920*a*, 1920*b*, are forced against the actuator, such as, for example, the moving belt 1912.

In an embodiment, the continuously moving structure, such as, for example, the moving belt 1912, may be running at some speed and may not have to speed up or slow down or change direction. Consequently, the continuously moving structure only runs in one direction at a certain speed. The clamping mechanism, such as, for example, the friction pads 1920*a*, 1920*b*, may be placed very close to a surface of the continuously moving structure, such as, for example, the surface of the moving belt 1912, such that there is zero contractile or frictional force when the pads are not in contact.

In an embodiment, the combined gap on each side of the surface of the continuously moving structure may be of the order of 0.1 mm. In an embodiment, the gap may be closed very quickly, such as, for example, in the order of 1 msec, with a model aircraft servomechanism, such as, for example, the Futaba BLS 351, which has a continuous torque rating of 1 N-m and maximum torque rating of 3 N-m.

In an embodiment, the time to reach a torque of 1 N-m may be approximately 4 msecs. If the clamping mechanism 1918, such as, for example, the Futaba BLS 351, exerts a clamping force on the friction pads through a comprising member, such as, for example, a 2 mm radius arm, then a clamping force of 500 N on either side of the surface of the continuously moving structure may be applied in approximately 5 msecs.

In an embodiment, the friction pads, such as, for example, automotive brake pads, are stiff in a direction perpendicular to the clamping direction to ensure effective clamping of the friction pads with the continuously moving surface. Further, in an embodiment, the surface of the continuously moving structure, such as, for example, the moving belt 1912, a steel band or the like, is stiff in the direction of clamping to possibly enable effective coupling of the mass with the continuously moving structure.

Consequently, in an embodiment, the clamping force may be increased rapidly as the friction pads 1920a, 1920b are clamped through a small distance and this clamping force of 500 N, as already calculated, may be exerted in 5 msecs. The kinetic friction coefficient of brake pads may be approximately 0.25. Accordingly, with a pair of opposing brake pads in an embodiment, a contractile force of 250 N is possible within a rise time of 5 msecs.

Whilst the above analysis assumes a constant friction coefficient between the friction pad 1920a or 1920b and surface of the moving belt 1912, the skilled person would realize that a corresponding analysis holds for a variable friction coefficient, mutatis mutandis.

In an embodiment, the variable contractile force may act anywhere over the displacement range, $X_{displ}$. Since the direction of motion 1914 of the moving belt 1912 is only unidirectional, the contractile force $F_{contractile}$ may also only be unidirectional. Further, the embodiment of FIG. 19 may represent one half of the muscle pair that is required to articulate a mass, such as, for example, a robot limb.

Various embodiments may also be used with machine systems, and not only robot limbs, such as, for example, to actuate a reciprocating machine part that uses an embodiment to displace a mass in one direction using the unidirectional force generated and to return the mass to its resting position using a resilient structure, such as, for example, a spring. Also an embodiment may actuate a non-returning, non-oscillating machine, or non-reciprocating machine element or robot limb as for example a jumping robot or a projectile shooting machine.

Accordingly, various embodiments may not only be used for slow moving or static robots, but may be capable of oscillating mass limbed robots. Consequently, it may be desirable for moving parts, such as, for example, the limb itself and the artificial skeletal muscle moving parts, to possess low mass inertia.

Most currently available actuators may reverse the direction of an electric motor armature mass and a gearbox train mass in order to oscillate a robot limb. There may be a disadvantage in doing this because the inertia of the armature and other moving parts could be amplified by the square of the gearbox ratio, which is usually in the order of 200:1 at least and may be as much as 300:1 or more. Thus, much energy may be lost in reversing the direction of motion of geared parts. Further, the reversing process may be slowed down, and this may impair the performance of oscillating mass robots that are capable of running, jumping and/or flying only if the robot limbs can oscillate fast enough or react fast enough.

In various embodiments, the actuator, such as, for example, the motor-gearbox 1908, may be kept running in one direction only and the high inertia of the motor-gearbox 1908 may not be not seen by the mass 1911. Further, the relatively high kinetic energy of the motor-gearbox 1908 may be an advantage because it may be capable of reducing fluctuations in the speed of surface of the moving belt 1912, as the mass (in an embodiment, the telescopic arm 1911) extracts periodic force impulses from it. The moving mass 1911, which may be connected to a limb, may have low mass (kg) because it may, in an embodiment, be equal to the mass of the friction pad system 1920a, 1920b, 1920c, plus the clamping mechanism 1918 plus the telescopic arm 1911; all of these components of which the mass may be made low.

In an embodiment, the apparatus may be capable of absorbing shock loads without damaging the motor 1908. This may be attributed to the maximum clamping force F applied to the friction pads 1920a, 1920b, being purposefully limited such that the maximum contractile force $F_{contractile}$ remains safely less than the force that may do damage to the motor gearbox teeth or the surface of the moving belt 1912.

As described above, various embodiments may also be used to actuate a reciprocating machine part. Accordingly, various embodiments may be capable of providing bidirectional motion using a unidirectional force. In an embodiment, a mass may be displaced in one direction using a unidirectional force and the mass returned to its resting position using a resilient structure, such as, for example, a spring.

The dynamics of reciprocating or oscillating masses may be designed to emulate low bidirectional output impedance, unidirectional impulsive forces seen in nature, such as, for example, the legs of a race horse or the legs of a cheetah, or the 25 Hz oscillating frequency wings of a hummingbird.

Figure 20:
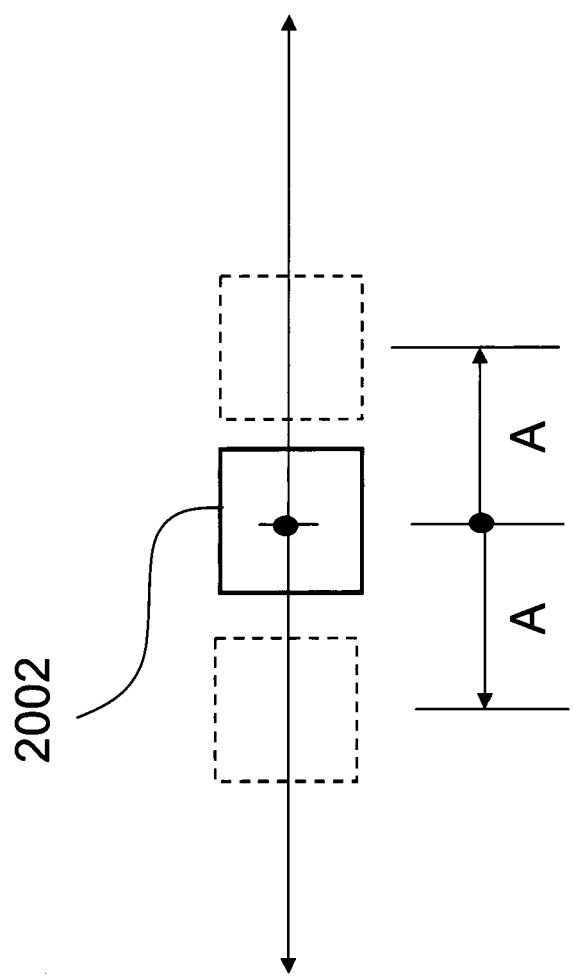
FIG. 20 illustrates a simplified lumped mass model of an oscillating mass.

FIG. 20 illustrates a simplified lumped mass model of an oscillating mass, such as, for example, an eagle wing flapping up and down. A mass 2002 may be, for example 0.25 kg, being oscillated along one axis only, the horizontal axis. The oscillating mass 2002 of 0.25 kg may be considered a simplified rectilinear, linearised, lumped mass, up-and-down, flapping oscillation of an eagle wing during hovering flight. The effects due to gravity are not considered in this embodiment since inertial effects and viscous friction loss effects are of interest. Assume that the oscillation is simple harmonic motion and the amplitude A is 0.5 m, and that the wing oscillation frequency during take-off is approximately 3 Hz which is equivalent to approximately 20 rad/s.

Accordingly, wing displacement, $x(m)=0.5 \sin(20 t)$; Wing velocity, $v(m/s)=dx/dt=10 \cos(20 t)$; Wing acceleration, $a(m/s^2)=dv/dt=-200 \sin(20 t)$; Force accelerating the wing, $F_{wing}=mass \times acceleration=-50 \sin(20 t)$; Mechanical power, P, to oscillate the wing $= F_{wing} \times velocity = -50 \sin(20 t) \times 10 \cos(20 t) = -250 \sin(40 t)$.

The equation for mechanical power, P, has a negative sign. However, the mechanical power is always positive since positive power may be required even when the velocity is in the opposite direction to the acceleration, such as, for example, a braking effect. Hence, the mechanical power required to oscillate the wing may be written as $P=|250 \sin(40 t)|$. Consequently, peak power, $P_{peak}=250$ watts.

The peak power $P_{peak}$ of 250 watts for a 0.25 kg mass oscillating at an amplitude of 0.5 m may be considered large. Since an eagle has two wings, then the bird may have to produce a peak power of 500 watts during hovering flight. This peak power does not yet take into account the power required to produce lift. Even if the bird has the ability to store some energy between peak power cycles, the average power may still be very high at about 350 watts. Once again, this may be construed as a system with wasteful energy usage.

Accordingly, it may be assumed that efficient energy usafe may be provided by a resonant system including a resilient structure such as, for example, a spring-mass system using elastic tendons. Therefore, assume that an eagle may flap its wings at a resonant natural frequency of, for example, $\omega_n=20$ rad/s. The spring stiffness, k, may be obtained from the equation for a resonant system: Natural frequency, $\omega_n=\sqrt{k/mass}$); rearranging: $k=mass\times\omega_n^2$; substituting values: Spring stiffness, k=100 N/m. Accordingly, it may be convenient to use a resilient structure including resilient members, such as, for example, two massless, pre-tensioned tensile springs, each with a stiffness of 50 N/m to obtain a 20 rad/s resonant system.

Figure 21:
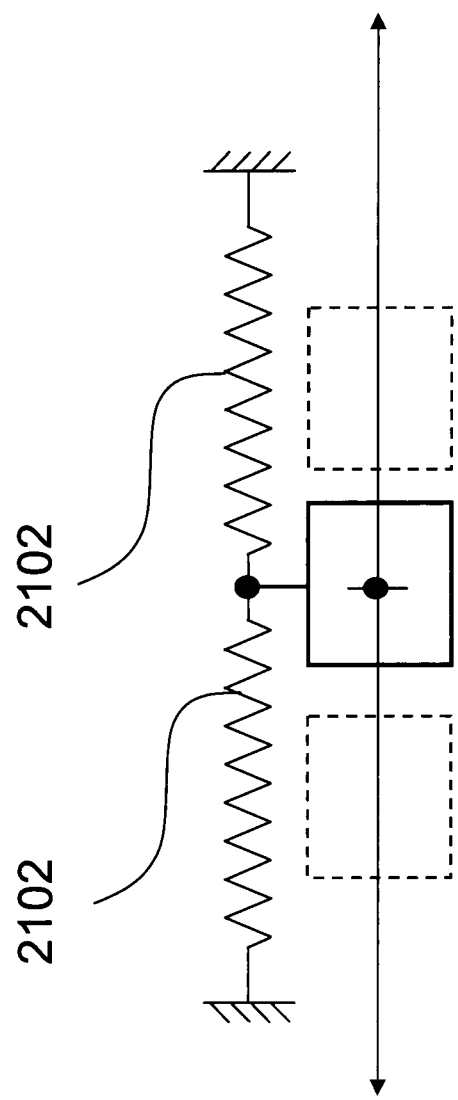
FIG. 21 illustrates a simplified lumped mass model of an oscillating mass in a resonant system with resilient structures.

FIG. 21 illustrates a simplified lumped mass model of an oscillating mass in a resonant system with resilient structure. In an embodiment, the resilient structure 2102 may enable oscillation or reciprocation of a mass about a resting position. It may be understood that the oscillating/reciprocating action may be effortless in overcoming the inertial forces. In this embodiment, the only power required may be in overcoming the dominant aerodynamic forces that produce lift plus minor friction forces in the wing joints. Accordingly, this may be considered as a resonant system with efficient energy usage.

A resonant system may be quantified by a quality factor, Q. A high Q indicates that a lower rate of energy loss relative to the stored energy of the oscillator, and consequently, the oscillation/reciprocation dies out more slowly. A high Q resonant system may have low friction, which, in turn, may result in a low damping ratio. If a force producing system (i.e, actuator) has friction, such as, for example, an electric motor with a gearbox or a pneumatic cylinder, then it may not be possible to excite an oscillating mass into resonance since there may be little or no resonant peak in such a force producing system. Accordingly, a possible way to create an excitable high Q resonant system may be to isolate the actuator friction from the mass and resilient structure system and to allow the mass and resilient structure system to have extremely low friction.

However, the power required to drive the isolated actuator may be excessive. Accordingly, a possible way to excite a high Q resonant system with low power may be to use: (i) one unidirectional exciter with as near perfect forward and backward driveability or (ii) two unidirectional exciters with as near perfect forward or backward driveability. Accordingly, a mass may be reciprocated using a small input of energy. Various embodiments of this type are illustrated in FIGS. 22 to 24.

Figure 22:
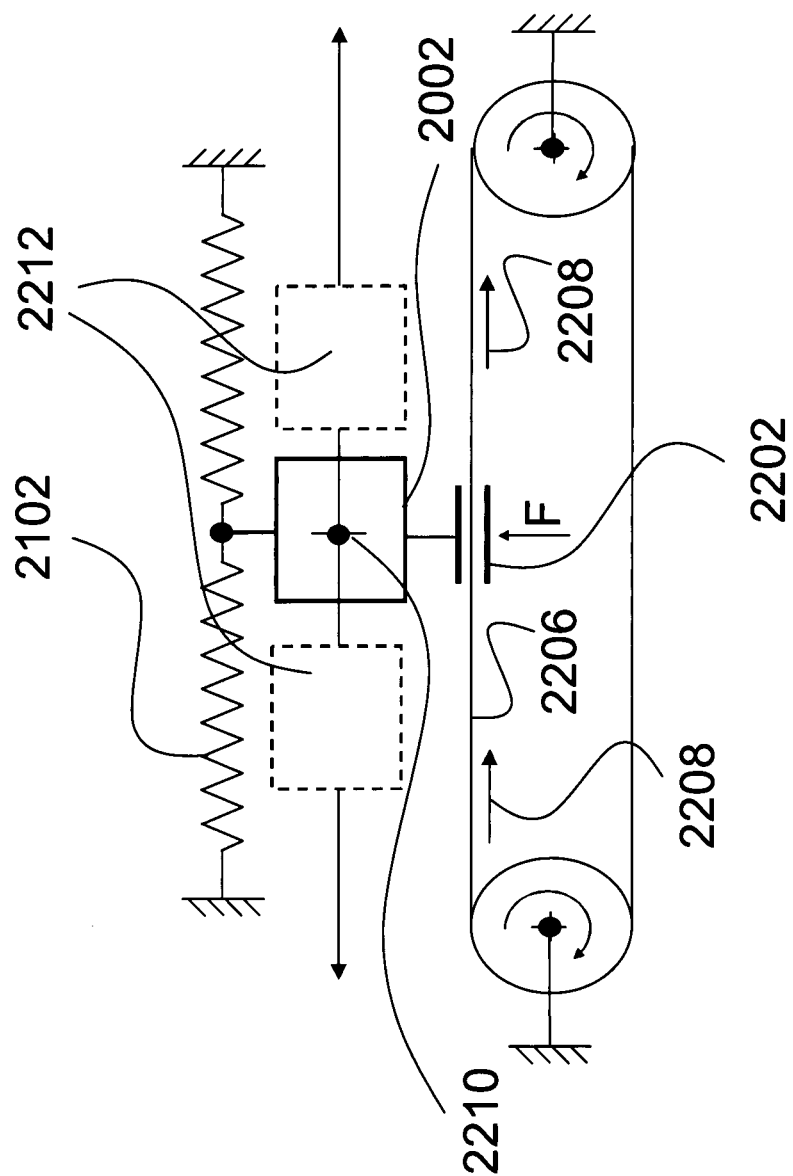
FIG. 22 illustrates an excitation method for a reciprocating resonant system using a single unidirectional impulse excitation.

FIG. 22 illustrates an excitation method for a reciprocating resonant system using a single unidirectional impulse excitation. In an embodiment, the clamping mechanism 2202 selectively couples the mass 2002 with at least a portion of the actuator 2206. The coupling of the mass 2002 with at least a portion of the actuator 2206 may be provided by a periodic clamping force F, which in turn generates a single periodic, unidirectional impulse in the direction of motion 2208 of the portion of the actuator 2206. When the mass and the actuator are decoupled, a resilient structure 2102 including resilient members provides a force acting in an opposite direction to the single periodic unidirectional impulse. Accordingly, in an embodiment, the force provided by the resilient structure 2102 may be in a direction opposite to the direction of motion 2208 of the portion of the actuator 2206. The opposite force urges the mass towards a resting position 2210, thus enabling the reciprocation or oscillation of the mass 2002 between two extreme points 2212.

Figure 23:
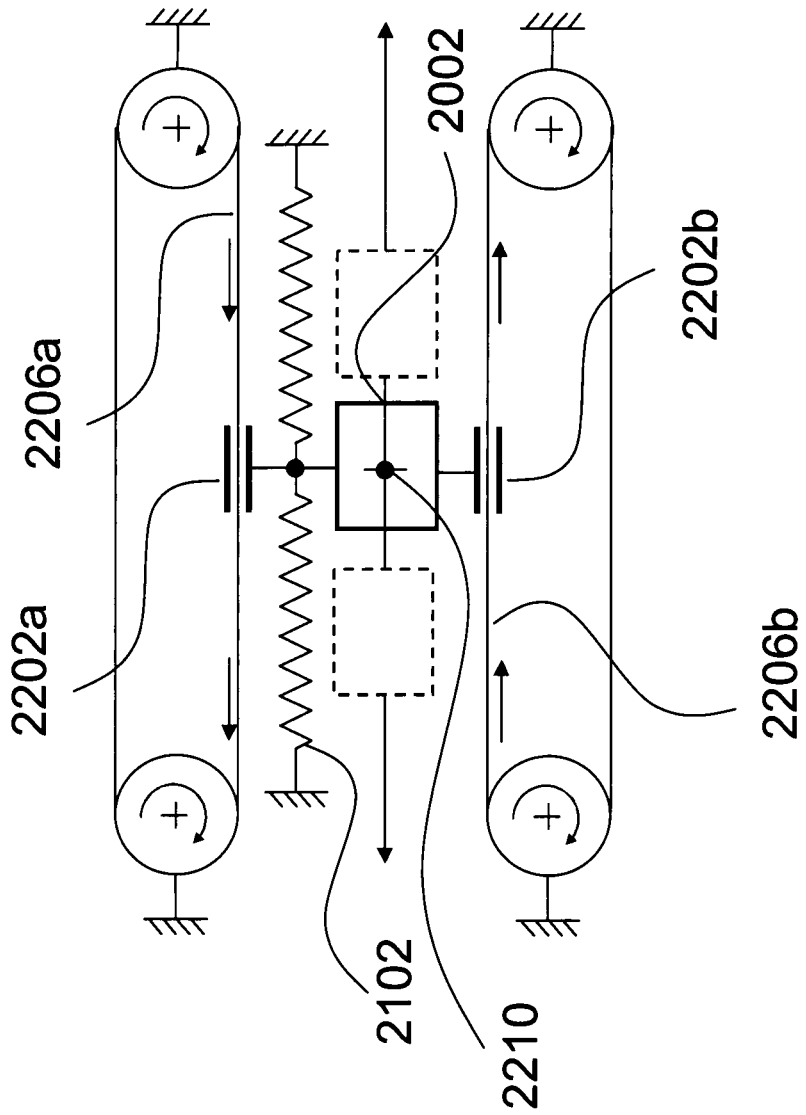
FIG. 23 illustrates an excitation method for a reciprocating resonant system using a pair of unidirectional, opposite-acting impulse excitations.

FIG. 23 illustrates an excitation method for a reciprocating resonant system using a pair of unidirectional, opposite-acting impulse excitations. In an embodiment, a pair of actuators 2206a, 2206b, each of which is selectively coupled with a mass 2002 at different times, each using a corresponding clamping mechanism 2202a, 2202b. The resilient structure 2102 urges the mass the mass 2002 towards a resting position 2210, and at least one of the actuators 2206a, 2206b may be used to intensify the oscillation.

Figure 24:
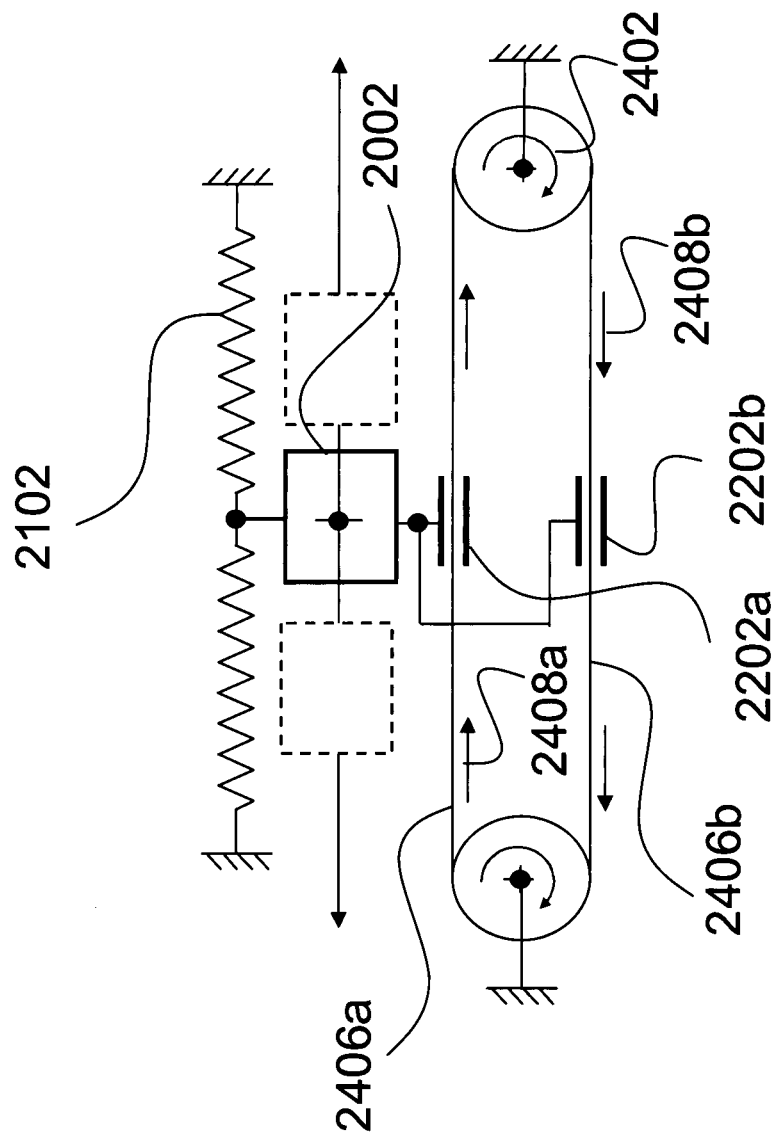
FIG. 24 illustrates an excitation method for a reciprocating resonant system using double-acting, single unidirectional impulse excitations.

FIG. 24 illustrates an excitation method for a reciprocating resonant system using double-acting, single unidirectional impulse excitations. In an embodiment, the actuator is actuating in only one direction, such as, for example, a clockwise direction 2402. In an embodiment, the actuator exerts a first unidirectional force 2408a on the mass 2002 and a second unidirectional force 2408b on the mass 2002. The first unidirectional force 2408a may be generated when the mass 2002 is coupled with at least a portion of the actuator 2406a using clamping mechanism 2202a. In an embodiment, the direction of the first unidirectional force 2408a is oriented in the direction of motion of the portion of the actuator 2406a.

The second unidirectional force 2408b is generated when the mass 2002 is coupled with at least a portion of the actuator 2406b. In an embodiment, the direction of the second unidirectional force is oriented in the direction of motion of the portion of the actuator 2406b using clamping mechanism 2202b. In an embodiment, the direction of the second unidirectional force 2408b is opposite to the direction of the first unidirectional force 2408a. The resilient structure 2102 aids in urging the mass towards a resting position. Accordingly, the mass is reciprocated using a small energy input.

In summary, exciting a high Q resonant system with low power may be possible using: (i) one unidirectional exciter with as near perfect forward and backward driveablility or (ii) two unidirectional exciters with as near perfect forward or backward driveability. Accordingly, a mass may be reciprocated using a small input of energy. The skilled person would also recognize that features described with reference to any one embodiment of a resonant system are equally applicable, and hereby restated, in respect of other embodiments of a resonant system.

Figure 25:
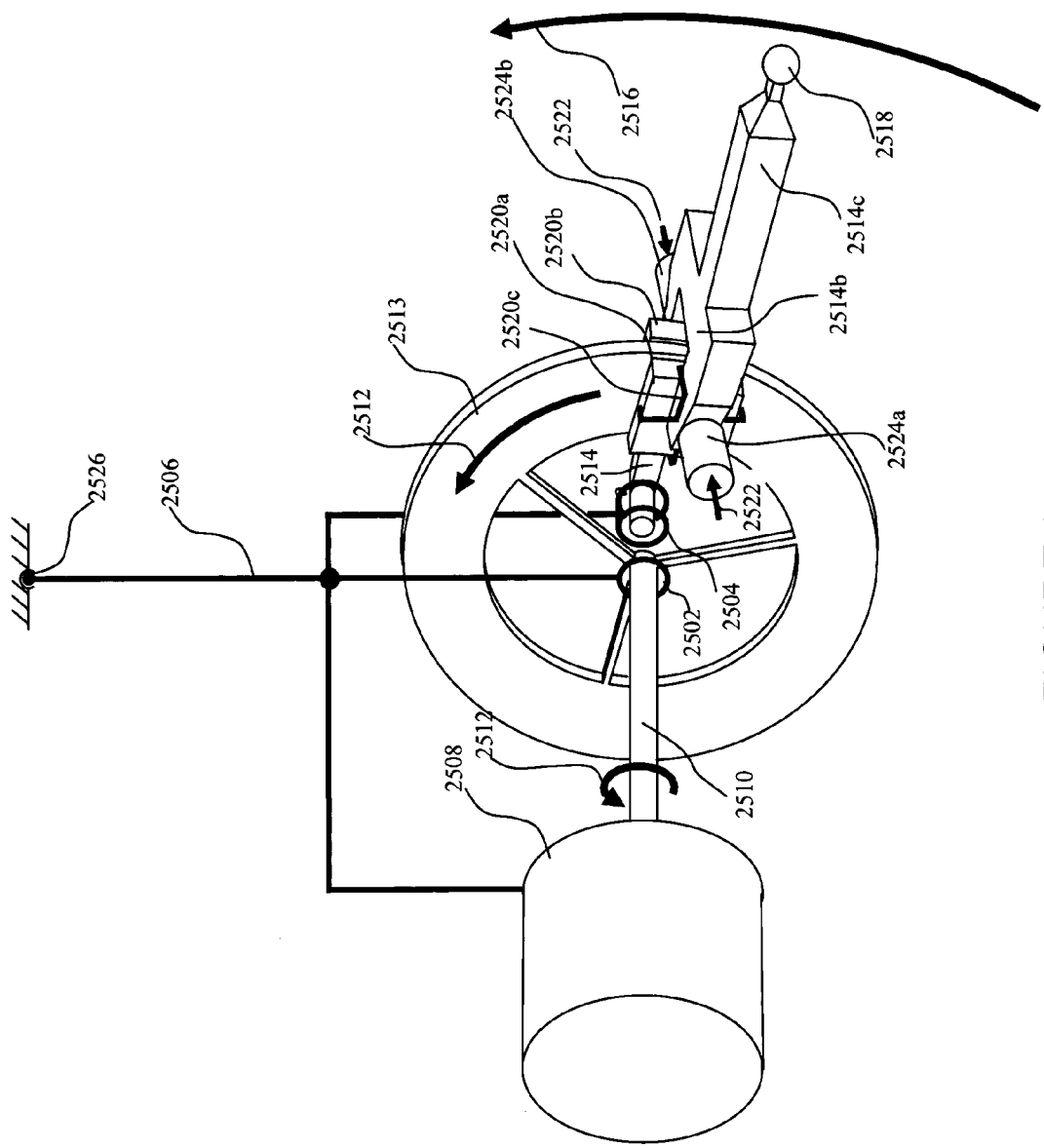
FIG. 25 illustrates a rotary embodiment of an apparatus for emulating an impulse force exerted by a skeletal muscle.

FIG. 25 illustrates a rotary embodiment of an apparatus for simulating a rotational impulse force exerted by a skeletal muscle. In an embodiment, the apparatus included an axle at 2502 and an axle at 2504. In an embodiment, axles at locations 2502 and 2504 may be advantageously co-axial but not necessarily so. A frame 2506 also secures a unidirectional actuator, such as, for example, a motor 2508 that drives a shaft 2510 in an anticlockwise direction 2512, that actuates in only one direction. In an embodiment, the actuator includes a continuously moving structure, such as, for example, a rotating member or surface, which may be a rotating wheel 2513.

In an embodiment, a mass may include a pivotable arm 2514a that may include, and may be stiffly connected to, a clamping mechanism 2514b and an extended arm 2514c which applies a rotational force to a mass in the upward or anticlockwise direction 2516 via point 2518. In an embodiment, the mass may pivotally coupled to the rotating member at the rotational axis of the rotating member. In an embodiment, the clamping mechanism includes friction pads 2520a and 2520b. In an embodiment, the friction pads are kept in position via finger components 2520c, which only allow motion with respect to clamping system 2514b in the direction of the clamping force 2522. In an embodiment, mechanisms 2524a and 2524b produce the clamping force that produces the unidirectional impulsive rotational force or torque that articulates a mass attached at said point 2518 and reference point 2526.

In an embodiment, the rotary embodiment of FIG. 25 is designed to flex a limb. A second mirror-imaged device running in the opposite direction may be required to extend the limb. Accordingly, in an embodiment, the unidirectional rotational force follows a circular path with a constant radius about a fixed center. It may be noted that placing two such embodiments of FIG. 25 back-to-back with the running surfaces 2513 rotating in opposite directions but at the same speed allows gyroscopic precession moments to be cancelled out.

Figure 26:
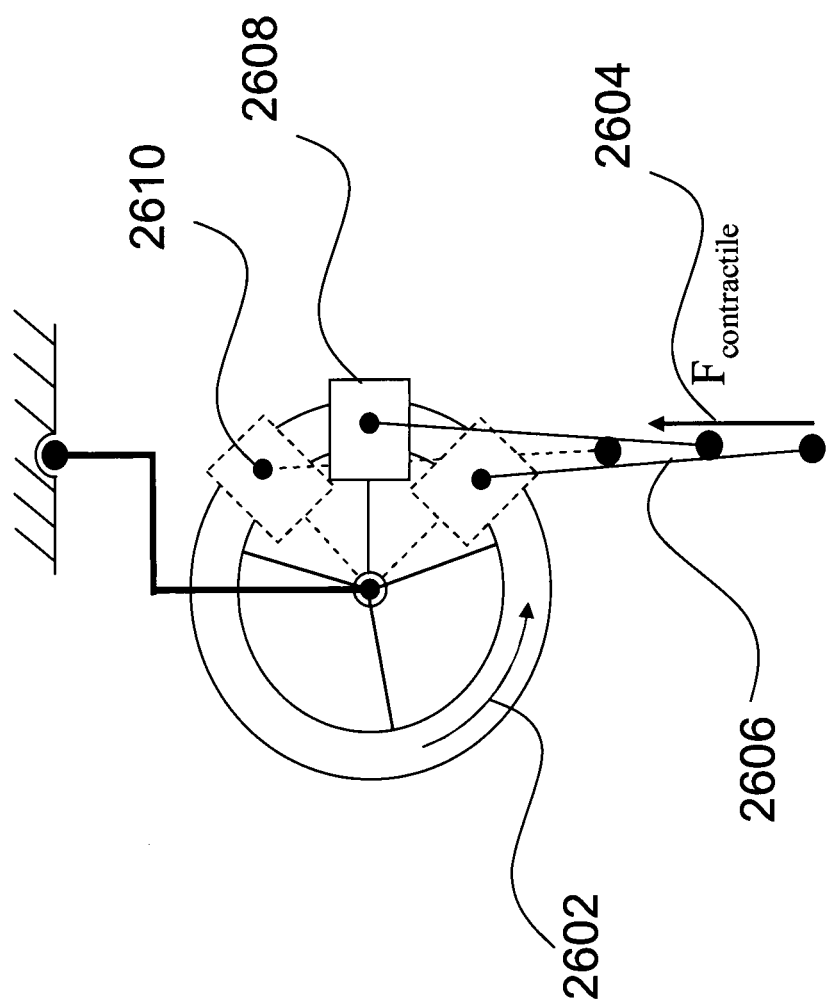
FIG. 26 illustrates the rotary embodiment of FIG. 25 modified into a near linear device.

FIG. 26 illustrates the rotary embodiment of FIG. 25 modified into a near linear device. In an embodiment, a unidirectional rotational force 2602 is modified into a unidirectional linear force 2604. In an embodiment, a mass 2606 is pivotally coupled to a clamping mechanism 2608 at a pivot point 2610 on the clamping mechanism 2608. In an embodiment, the pivot point 2610 need not be at a point on the clamping mechanism 2608.

Figure 27:
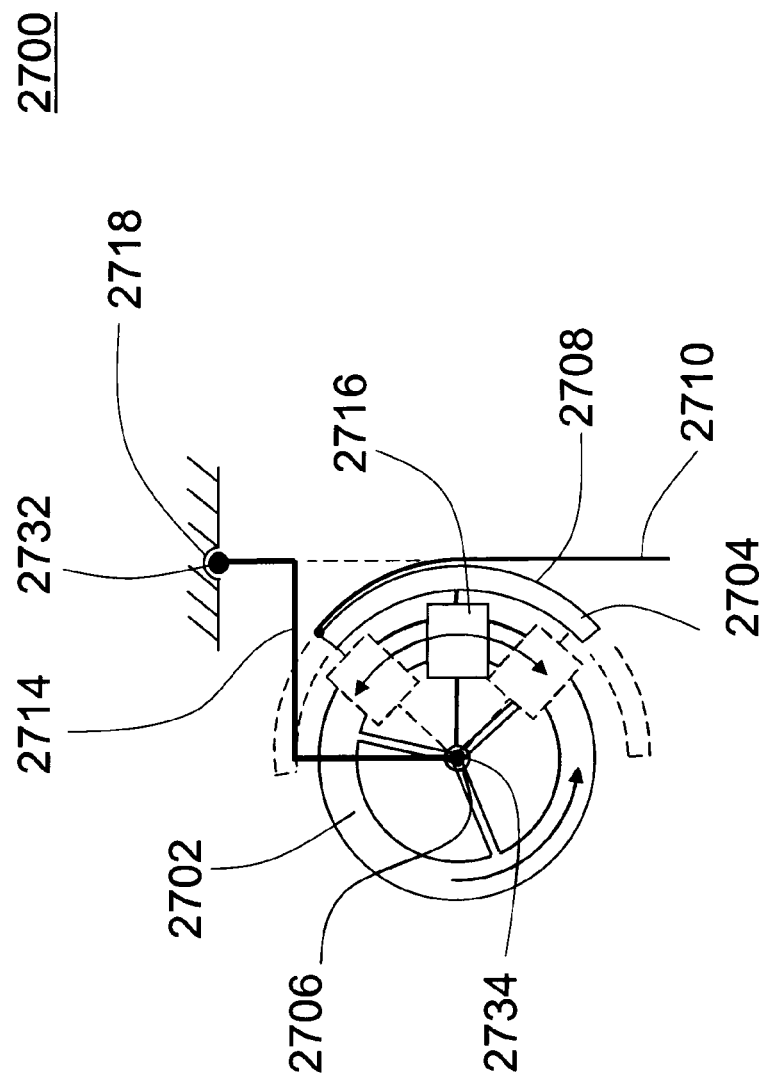
FIG. 27 illustrates a rotary embodiment modified into a rectilinear device.

FIG. 27 illustrates a rotary embodiment of the above apparatus modified into a rectilinear device. The rotary embodiment produces a unidirectional force that emulates a rectilinear contractile force. In an embodiment, the apparatus 2700 may include an actuator 2702, an arcuate member 2704 rotatable about a rotational axis 2706 having an arcuate surface 2708 spaced radially from the rotational axis 2706 in such a way that the arcuate surface 2708 arches away from the rotational axis 2706. In the embodiment, the arcuate member 2704 may be coupled to the actuator 2702 and adapted to rotate about the rotational axis 2706 when actuated. In the embodiment, a cable 2710 may be attached to the arcuate member 2704 on the arcuate surface 2708 at one end and the other end may be suspended from the arcuate member 2704 such that a portion of the cable 2710 rests on the arcuate surface 2708 and the other portion extends tangentially from the arcuate surface 2708. In the embodiment, a mass (not shown in FIG. 27) may be attached to the cable 2710 at the other end and suspend from the arcuate member 2704. The skilled person would recognize that the rotation of the arcuate member 2704 in a direction e.g. counter-clockwise would result in an upward linear movement of the mass. In other words, a unidirectional rotation is modified into a unidirectional linear motion and a unidirectional rotational force imparted by the rotation of the arcuate member 2704 is modified into a unidirectional rectilinear contractile force acting on the mass.

In an embodiment, the actuator 2702 may include a rotating member rotatable about the rotational axis 2706 and a clamping mechanism 2716 adapted to clamp onto the rotating member. The clamping mechanism 2716 may be coupled to the arcuate member 2704 such that when the clamping mechanism 2716 clamps into the rotating member, the clamping mechanism 2716 together with the arcuate member 2704 may be rotated about the rotational axis 2706 in the direction of rotation of the rotating member. Although the arcuate member 2704 may rotate in a clockwise or counter-clockwise direction, the arcuate member 2704 can only rotate in the direction of the rotating member.

In an embodiment, a frame 2714 may have a first end 2732 and a second end 2734 spaced from the first end 2732 wherein the first end 2732 may be mounted to a mounting point 2718 and the rotating member may be rotatably mounted to the second end 2734 of the frame 2714.

In an embodiment, the rotating member may be a wheel.

In an embodiment, the arcuate member 2704 may be rotatably mounted to the frame 2714.

In an embodiment, the arcutate member 2704 and the rotating member may be mounted to the frame 2714 via bearings.

In an embodiment, the cable 2710 may alternatively be a chain, a string or a belt.

In an embodiment, the unidirectional linear force may pass through the mounting point so that there is zero or no moment at the mounting point 2718 due to the unidirectional rectilinear contractile force.

In an embodiment, the clamping mechanism 2716 may include a pair of friction producing elements, such as, for example, opposing friction pads.

Figure 28:
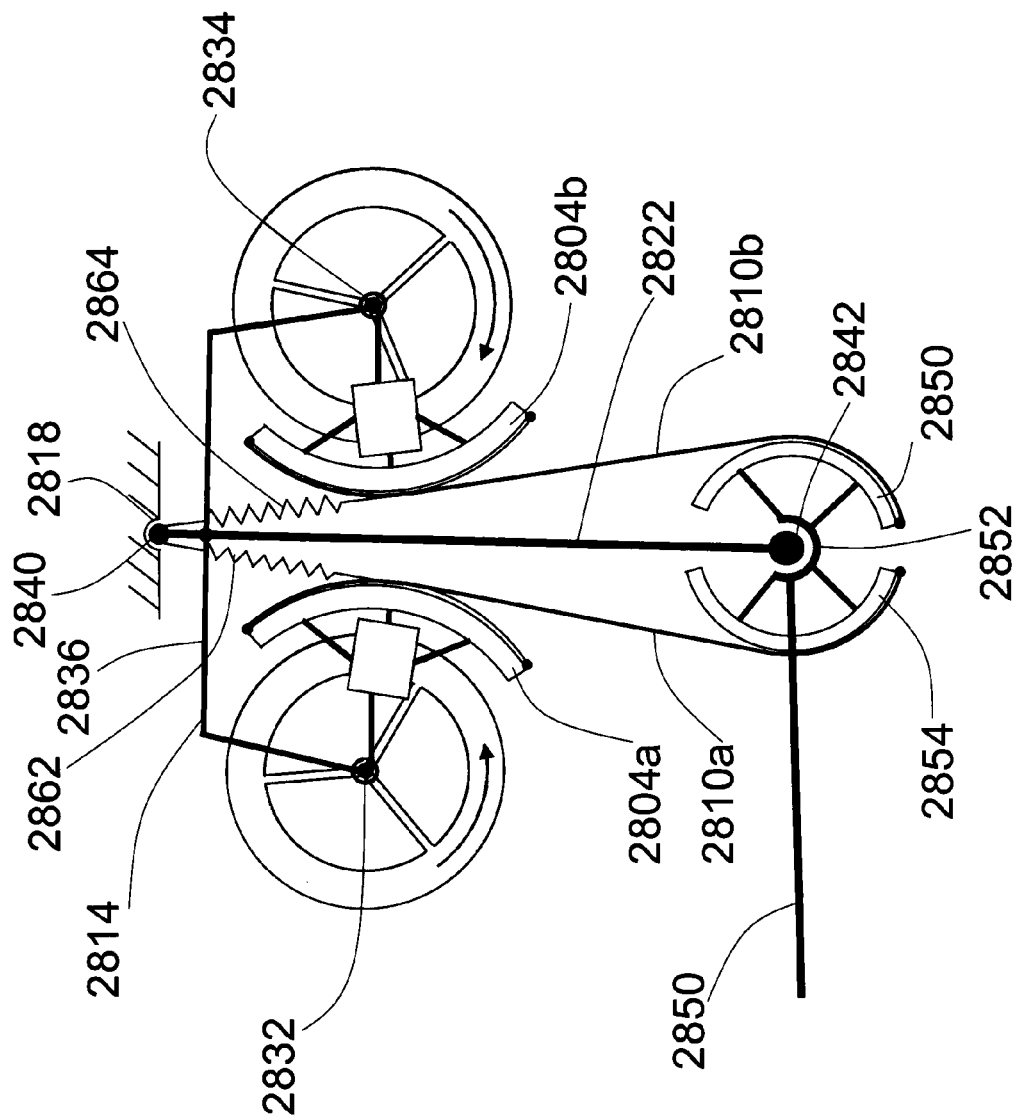
FIG. 28 illustrates the rotary embodiment of FIG. 27 adapted to rotate an arm.

FIG. 28 illustrates an embodiment using rotary to rectilinear unidirectional force to produce bidirectional motion of an arm. The embodiment has an apparatus 2800 having a first and second apparatus in FIG. 27 in opposing configuration such that the arcuate member 2804a of the first apparatus 2800a faces the arcuate member 2804b of the second apparatus 2800b.

In the embodiment, a frame 2814 may have a vertical member 2822 having a mounting end 2840 and a connecting end 2842 opposite to the mounting end 2840 and a horizontal member 2836 intersecting and substantially perpendicular to the vertical member 2822 between the mounting end 2840 and connecting end 2842. The horizontal member having a first end 2832 on one side of the vertical member 2822 and a second end 2834 on the other side of the vertical member 2822 opposite the first end 2832. The frame 2814 may be mounted to a mounting point 2818 at the mounting end 2840.

In an embodiment, the vertical member 2822 may extend in a direction equidistant from the first end 2832 and the second end 2834.

In the embodiment, the rotating member 2802a of the first apparatus 2800a may be rotationally mounted to the first end 2832 and the rotating member 2802b of the second apparatus 2800b may be rotationally mounted to the second end 2834 of the frame 2814.

In the embodiment, an arm 2850 may have a pivoting end 2852 and may be pivotally connected to the connecting end 2842 of the frame 2814 via the pivoting end 2852. The pivoting end 2852 may have a first arcuate surface 2854 spaced from the pivoting end 2852 and a second arcuate section 2856 spaced from the pivoting end 2852 and substantially opposite to the first arcuate surface 2854 such that the first arcuate surface 2854 and the second arcuate surface 2856 arch away from the pivoting end 2852. In the embodiment, the vertical member 2822 may be disposed between the first arcuate surface 2854 and the second arcuate surface 2856. In an embodiment, the first arcuate surface 2854 and the second arcuate surface 2856 may form part of an external surface of a cylindrical tube.

In the embodiment, the cable 2810a of the first apparatus extends from the arcuate member 2804a of the first apparatus to the first arcuate surface 2854 and has a portion of the cable 2810a extending along the first arcuate surface 2854. The cable 2810b of the second apparatus extends from the arcuate member 2804b of the second apparatus to the second arcuate surface 2856 and has a portion of the cable 2810b extending along the second arcuate surface 2856.

In the embodiment, a first spring 2862 may be connected between the mounting point 2818 and the arcuate member 2804a of the first apparatus to resist the rotation of the arcuate member 2804a so as to maintain tautness in the cable 2810a of the first arcuate member 2804a. Similarly, a second spring 2864 may be connected between the mounting point 2818 and the arcuate member 2804b of the second apparatus.

Figure 29:
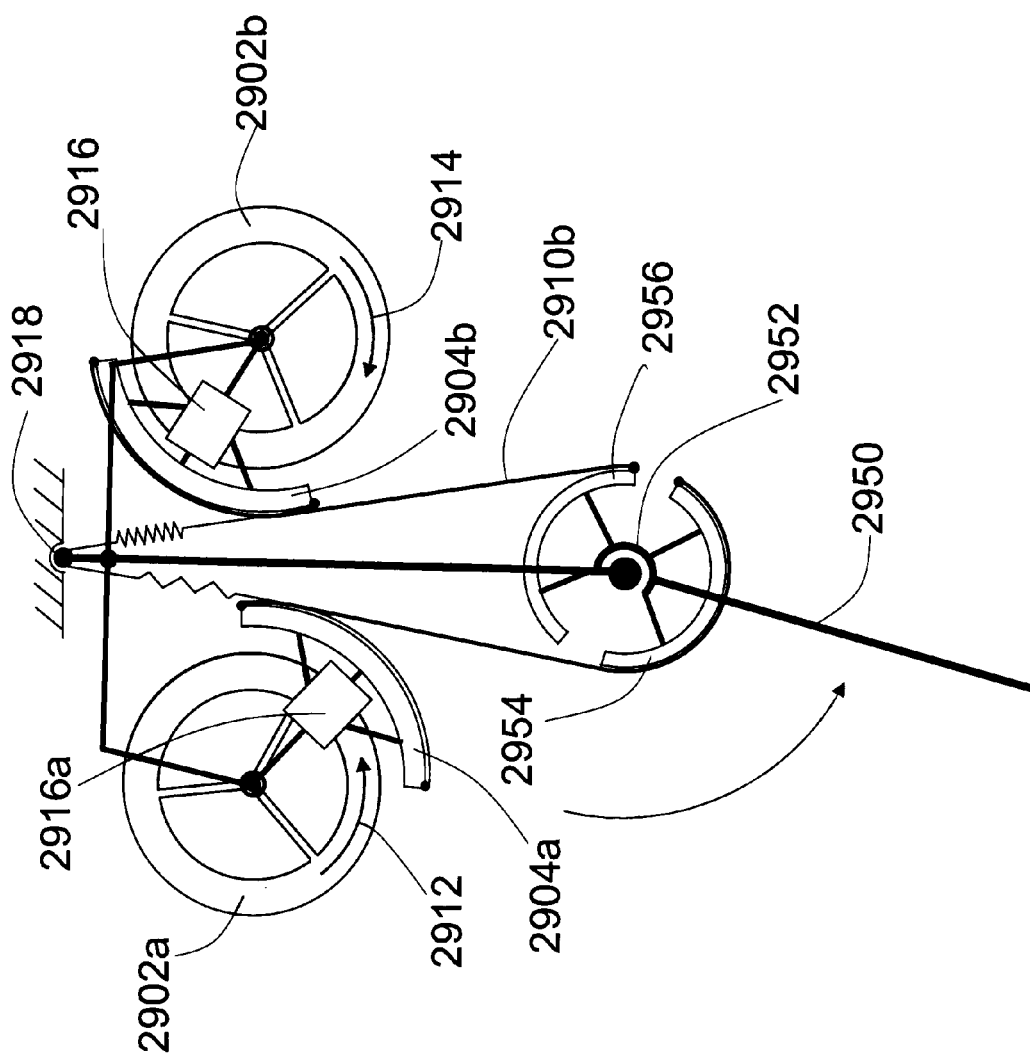
FIG. 29 illustrates the rotation of the arm in FIG. 28 in a counter-clockwise direction.

FIG. 29 illustrates the embodiment in FIG. 28 in use. In an embodiment, the rotating members of the first and second apparatus may be kept rotating and the respective arcuate members are actuated when the relevant clamping mechanisms are activated to clamp onto the rotating members. As shown in FIG. 29, the rotating member 2902a may rotate in a counter-clockwise direction 2912 and the rotating member 2902b may rotate in a clockwise direction 2914. In an embodiment, the direction of rotations can be in the opposite direction as long as the direction of rotation of one rotating member is opposite to the direction of rotation of the other rotating member.

In the embodiment, when the clamping mechanism 2916b of the second apparatus clamps onto the rotating member 2902b of the second apparatus, the rotating member 2902a of the first apparatus would not be clamped by the clamping mechanism 2916a of the first apparatus. The arcuate member 2904b of the second apparatus may be rotated in a clockwise direction thereby pulling the cable 2910b of the second apparatus towards the mounting point 2918. Accordingly, the cable 2910a of the first apparatus may be pulled away from the mounting point 2918 due to the rotation of the first and second arcuate surface 2954, 2956 of the arm 2950 in a counter-clockwise direction. Accordingly, the arm 2950 may be rotated about the pivoting end 2952 in anti-clockwise direction.

Figure 30:
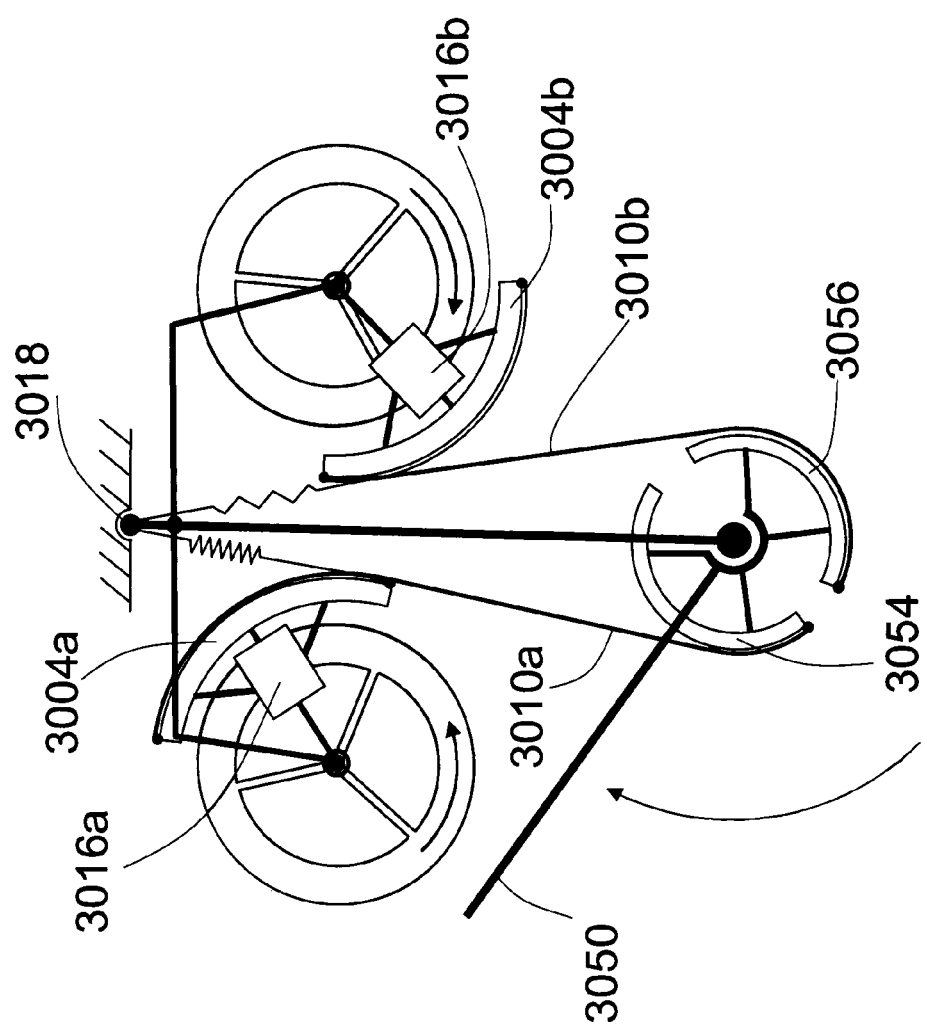
FIG. 30 illustrates the rotation of the arm in FIG. 28 in a clockwise direction.

FIG. 30 illustrates same embodiment as that in FIG. 28 except that in the present embodiment, the clamping mechanism 3016a of the first apparatus clamps onto the rotating member 3002a of the first apparatus and the rotating member 3002b of the second apparatus is not clamped by the clamping mechanism 3016b of the second apparatus. The arcuate member 3004a of the first apparatus may be rotated in a counter-clockwise direction thereby pulling the cable 3010a of the first apparatus towards the mounting point 3018. Accordingly, the cable 3010b of the second apparatus may be pulled away from the mounting point 3018 due to the rotation of the first and second arcuate surface 3054, 3056 of the arm 3050 in a clockwise direction. Accordingly, the arm 3050 may be rotated about the pivoting end 3052 in anti-clockwise direction.

In the embodiment, it may be appreciated by the skilled person that the direction of force exerted by the apparatus passes through the mounting point 2818 so that there is no moment of force at the mounting point 2818 when the apparatus is in use.

Figure 31:
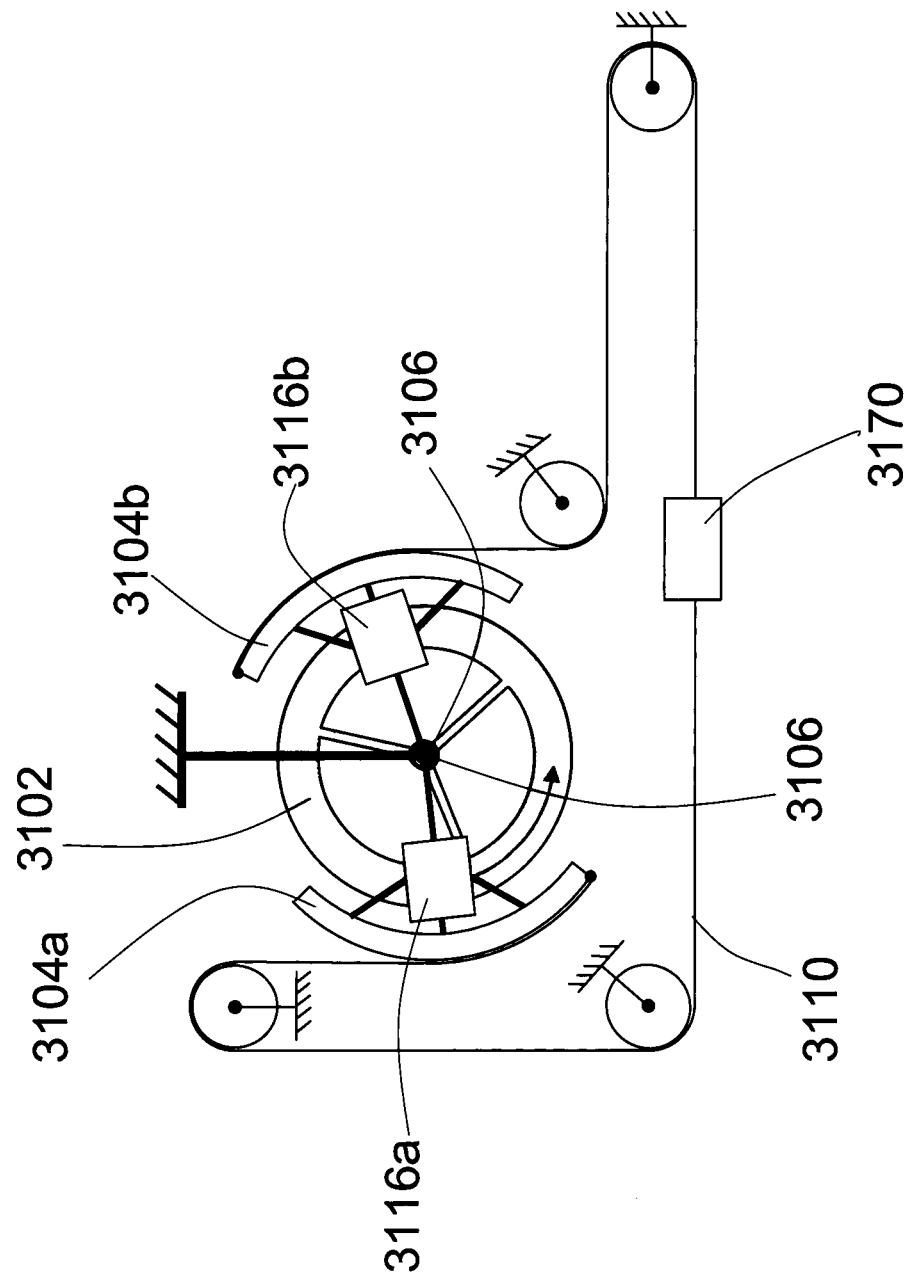
FIG. 31 illustrates a rotary embodiment used to oscillate a mass.

FIG. 31 illustrates an embodiment in FIG. 27 except that the actuator in the present embodiment may included two arcuate members, a first arcuate member 3104a and a second arcuate member 3104b may be disposed substantially opposite to the first arcuate member 3104a of the rotational axis 3106. In an embodiment, the first arcuate member 3104a may be disposed adjacent the second arcuate member 3104b.

In the embodiment, the mass 3170 may be oscillated by alternating the sequence of the clamping mechanisms 3116a, 3116b. When the first clamping mechanism 3116a clamps onto the rotating member 3102 without the second clamping mechanism 3116b clamping on the rotating member 3102, the counter-clockwise rotation of the rotating member 3102 forces the first arcuate member 3104a to rotate counter-clockwise about the rotational axis 3106. The rotation of the first arcuate member 3104a pulls the cable 3110 and therefore the mass 3170 towards the first arcuate member 3104a.

On the other hand, when the second clamping mechanism 3116b clamps onto the rotating member 3102 without the first clamping mechanism 3116a clamping on the rotating member 3102, the counter-clockwise rotation of the rotating member 3102 forces the second arcuate member 3104a to rotate counter-clockwise about the rotational axis 3106 and the rotation of the second arcuate member 3104a pulls the cable 3110 and therefore the mass 3170 towards the second arcuate member 3104a. As such, the alternate clamping and unclamping of the clamping mechanism 3116a,3116b oscillates the mass 3170.

Figure 32:
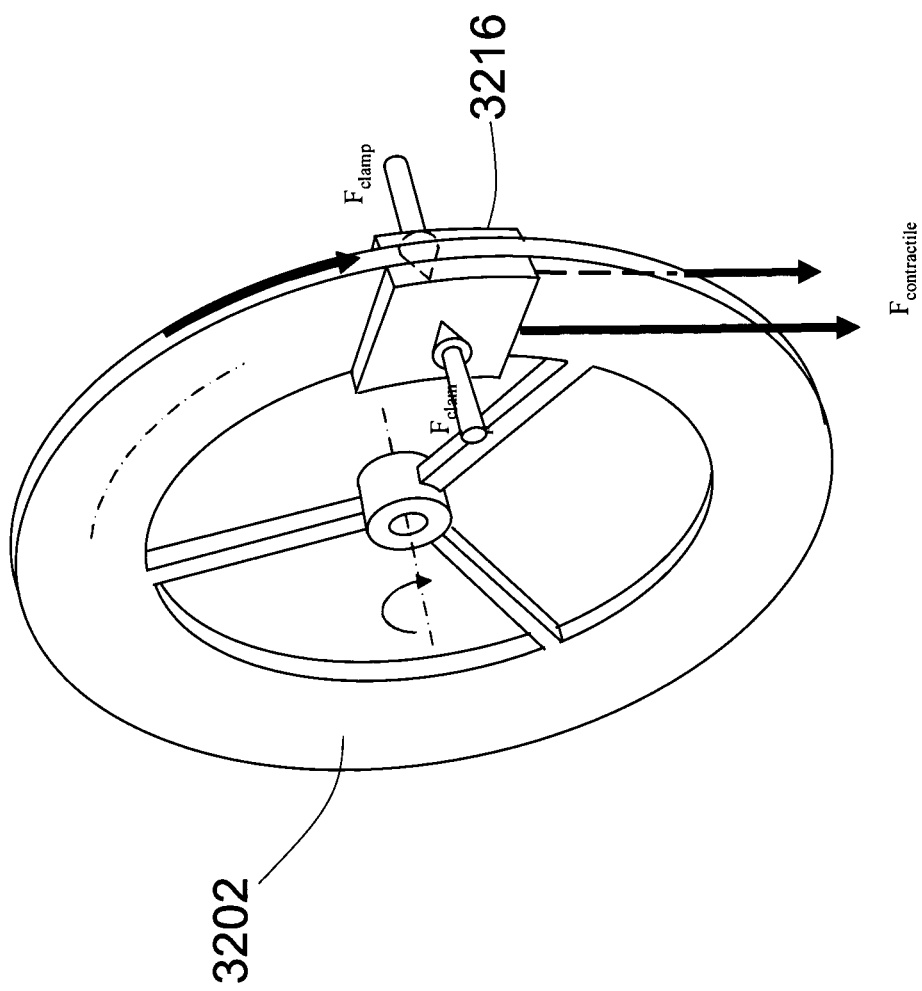
FIG. 32 illustrates a perspective view of an actuator.

FIG. 32 illustrates a perspective view of the rotating member 3202 with the clamping mechanism 3216. When a clamping force, $F_{clamp}$, is exerted onto the rotating member 3202 by the clamping mechanism 3216, the contractile force, $F_{contractile}$, exerted onto a mass (not shown in FIG. 32) may be approximated by the formula: $F_{contractile}=2\times\mu\times F_{clamp}$.

Figure 33:
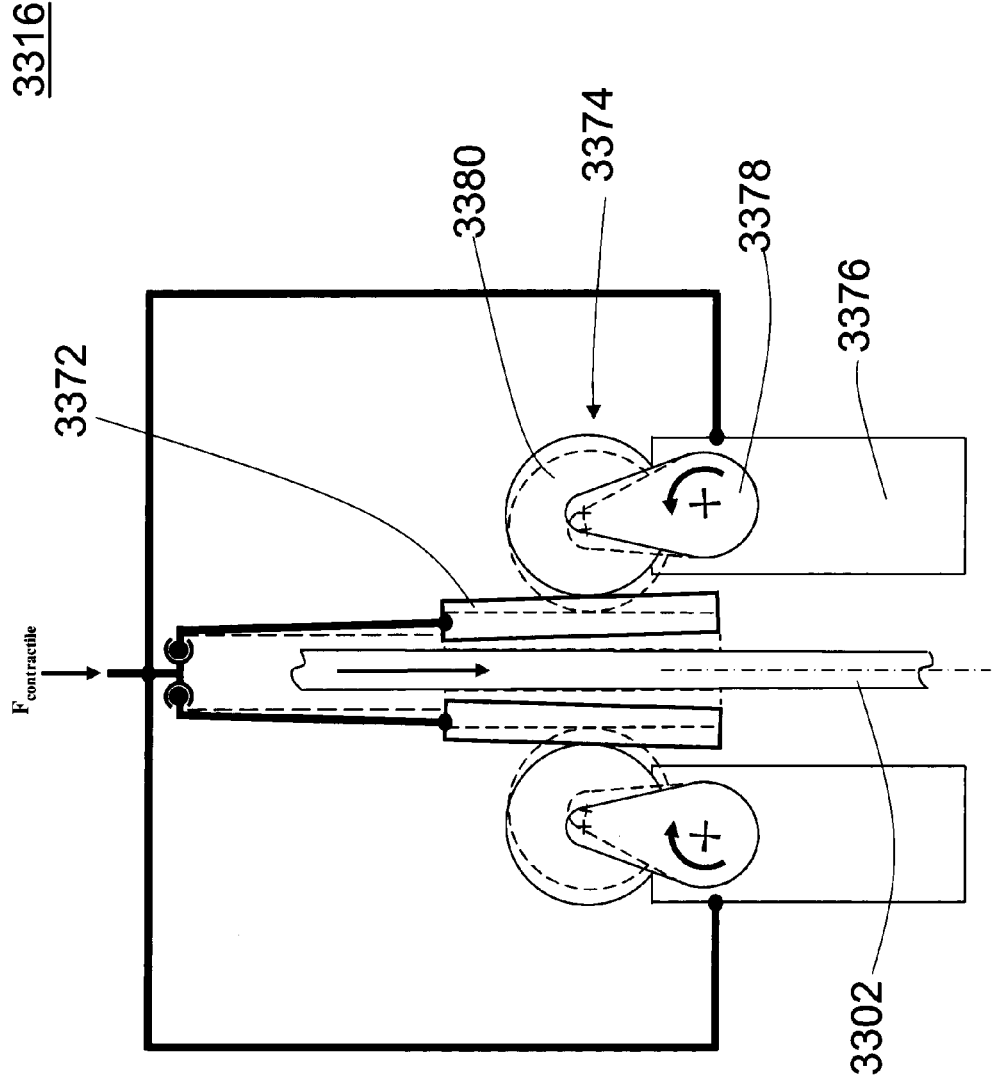
FIG. 33 illustrates a detailed elevation view of the actuator in FIG. 32.

FIG. 33 illustrates a detailed elevation view of the apparatus in FIG. 32. FIG. 33 shows a clamping mechanism 3316. The clamping mechanism 3316 includes a pair of friction pads 3372 and a rotating member 3302 disposed between the pair of friction pads 3372. The clamping mechanism 3316 further includes a pair of actuating arms 3374, each in contact with one of the friction pad 3372 to exert a force onto the friction pads 3372 towards the rotating member 3302 thereby exerting a clamping force onto the rotating member 3302. The actuating arm 3374 includes a servo mechanism 3376 and a clamping arm 3378 rotatably connected to the servo mechanism 3376 at one end and a ball bearing race 3380 rotatably connected to the other end of the clamping arm 3378.

The servo mechanism 3376, when activated, rotates the clamping arm 3378 towards the friction pads 3372 and pushes the ball bearing race 3380 onto the friction pads 3372 thereby exerting a clamping force onto the rotating member 3302.

Figure 34:
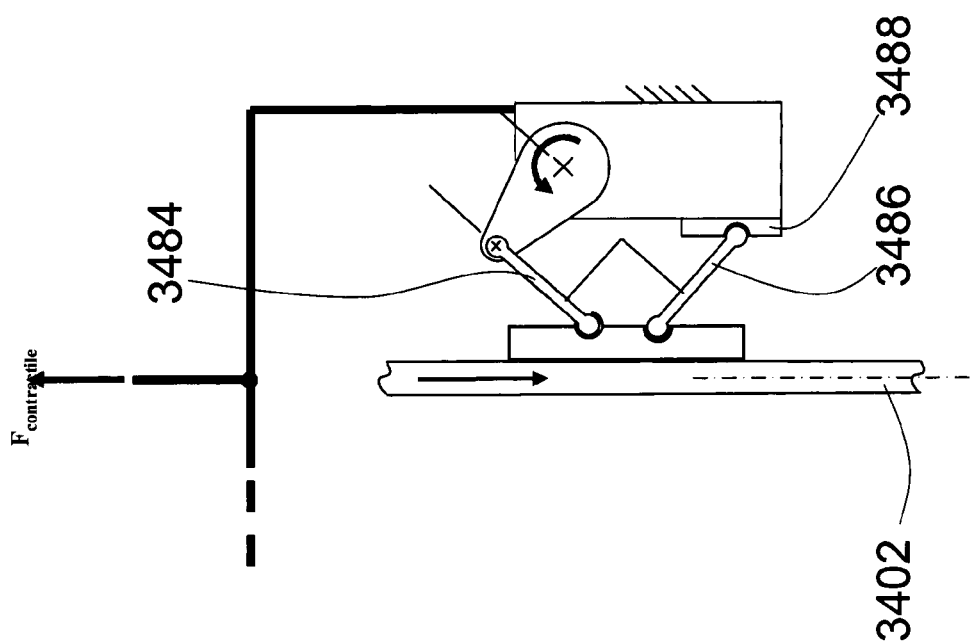
FIG. 34 illustrates another embodiment of the actuator in FIG. 33.

FIG. 34 shows another embodiment of clamping mechanism 3416. The clamping mechanism 3416 includes a servo mechanism 3476 and a clamping arm 3478 rotatably connected to the servo mechanism 3476. A friction pad 3472 may be disposed adjacent a rotating member 3402. The friction pad 3472 may be held in place by a first linkage 3484 rotatably connected to the clamping arm 3478 at one end and rotatably connected to the friction pad 3472 at the other end and by a second linkage 3486 rotatably connected to a base 3488 at one end and rotatably connected to the friction pad 3472 at the other end.

The servo mechanism 3476 when activated, rotates the clamping arm 3478 in a counter-clockwise direction towards the rotating member 3402 and due to the configuration of the first and second linkages 3484,3486, the first linkage 3484 is rotated in a clockwise direction and the second linkage 3486 is rotated in a counter-clockwise direction and both first and second linkages 3484,3486 forces a friction pad 3472 onto the rotating member 3402 thereby clamping the rotational member 3402. In FIG. 34, only one side of clamping mechanism 3416 is shown. However, the clamping mechanism 3416 may have two sides, the second side being a mirror of the first side.

In summary, various embodiments relate to providing articulation to machine systems, such as, for example, robot limbs, where rapid bidirectional motion may be required with high mechanical efficiency produced by an artificial muscle. In various embodiments, the artificial muscle may be characterized by high force and fast reaction capability plus high power-to-weight ratio.

Various embodiments may enable tetherless dynamic robots that run, jump, fly and swim. Furthermore, various embodiments are designed to be equally as effective in the slow motion articulation (velocity servomechanism) and static position holding (displacement servomechanism) of limbs. Various embodiments are capable of creating a programmable force Impulse, I=∫F·dt, where t is time and F is muscle contractile force which can be programmed as a force-time signature, F=f(t).

Various embodiments may possess extremely high forward and backward driveability, i.e. low bidirectional output impedance. This action may emulate biological skeletal muscle. Various embodiments are passive, which, in this context, implies that low bidirectional output impedance is obtained inherently in the design methodology.

In various embodiments, the actuator may possess low moving mass. Further, various embodiments, each being a unidirectional apparatus, imply that a pair of apparatuses may be required for the bidirectional motion of a mass. However, an embodiment has been described which generates a bidirectional force from a unidirectional device (FIG. 24).

While the invention has been particularly shown and described with reference to specific example embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An apparatus for emulating a force impulse exerted by a skeletal muscle, the apparatus comprising:
 a mass;
 an actuator, the actuator being adapted to exert a unidirectional force, a unidirectional torque, a unidirectional moment or unidirectional couple on the mass; and
 a clamping mechanism configured to apply a clamping force variable over a range from zero force up to a predetermined maximum force and configured in use to selectively couple together the mass and the actuator,
 wherein the unidirectional force, the unidirectional torque, the unidirectional moment or the unidirectional couple exerted on the mass by the actuator emulates the force impulse.

2. The apparatus according to claim 1, wherein the unidirectional force is a unidirectional rectilinear force.

3. The apparatus according to claim 1, wherein the unidirectional force is a unidirectional rotational force.

4. The apparatus according to claim 1, wherein the actuator comprises the clamping mechanism, and the clamping force is applied to the actuator to selectively couple the actuator to the mass.

5. The apparatus according to claim 1, wherein the mass comprises the clamping mechanism, and the clamping force is applied to the mass to selectively couple the mass to the actuator.

6. The apparatus according to claim 1, wherein the mass is coupled to the clamping mechanism, and the clamping force is applied to the clamping mechanism to selectively couple the actuator and the mass.

7. The apparatus according to claim 1, wherein the clamping mechanism comprises a pair of friction pads, at least a portion of the actuator being positioned between the pair of friction pads, the pair of friction pads being configured in use to move towards each other to apply the clamping force.

8. The apparatus according to claim 1, wherein the actuator comprises a continuously moving structure, and the clamping mechanism is configured in use to selectively couple together the mass and the continuously moving structure to exert the unidirectional force, the unidirectional torque, the unidirectional moment or the unidirectional couple on the mass.

9. The apparatus according to claim 8, wherein the continuously moving structure is a belt and pulley system.

10. The apparatus according to claim 9, wherein the belt and the pulley surfaces have cooperating features which in use engage together to prevent slippage of the belt with respect to the pulley.

11. The apparatus according to claim 9, wherein at least one pulley is translatable and configured in use to translate to tauten the belt.

12. The apparatus according to claim 9, wherein the belt is stiff in a direction of the clamping force, and wherein the direction of the clamping force is perpendicular to a direction of motion of the belt.

13. The apparatus according to claim 8, wherein the continuously moving structure is configured in use to have a variable speed.

14. The apparatus according to claim 1, further comprising a resilient structure, the resilient structure being configured in use to urge the mass towards a resting position when the mass and the actuator are decoupled.

15. The apparatus according to claim 14, wherein the resilient structure comprises one or more resilient members.

16. An assembly for simulating an impulse force exerted by a skeletal muscle, the assembly comprising a pair of apparatuses, wherein each apparatus of the pair of apparatuses comprises:
 a mass;
 an actuator, the actuator being adapted to exert a unidirectional force, a unidirectional torque, a unidirectional moment or unidirectional couple on the mass; and
 a clamping mechanism configured to apply a clamping force variable over a range from zero force up to a predetermined maximum force and configured in use to selectively couple together the mass and the actuator,
 wherein the unidirectional force, the unidirectional torque, the unidirectional moment or the unidirectional couple exerted on the mass by the actuator emulates the force impulse.

17. The assembly according to claim 16, each apparatus being configured in use to exert its unidirectional force, unidirectional torque, unidirectional moment or unidirectional couple in an opposite direction to the other apparatus.

18. An apparatus for simulating first and second impulse forces exerted by a skeletal muscle, the apparatus comprising:
 a mass;
 an actuator, the actuator being adapted to exert a first unidirectional force, a first unidirectional torque, a first unidirectional moment or a first unidirectional couple on the mass and a second unidirectional force, a second unidirectional torque, a second unidirectional moment or a second unidirectional couple on the mass, the first unidirectional force, the first unidirectional torque, the first unidirectional moment or the first unidirectional couple acting on the mass in an opposite direction to the second unidirectional force, the second unidirectional torque, the second unidirectional moment or the second unidirectional couple; and a clamping mechanism configured to apply a clamping force variable over a range from zero force up to a predetermined maximum force and configured in use to selectively couple together the mass and the actuator wherein the first unidirectional force, the first unidirectional torque, the first unidirectional moment or the first unidirectional couple exerted on the mass by the actuator emulates the first impulse force, and the clamping mechanism further configured in use to selectively couple together the mass and the actuator, wherein the second unidirectional force, the second unidirectional torque, the second unidirectional moment or the second unidirectional couple exerted on the mass by the actuator emulates the second impulse force.

19. The apparatus according to claim 18, wherein the actuator comprises a continuously rotating structure capable of actuating in only one direction, the clamping mechanism being configured in use to selectively couple together the mass and a first portion of the continuously rotating structure, wherein the first unidirectional force, the first unidirectional torque, the first unidirectional moment or the first unidirectional couple exerted on the mass by the actuator emulates the first impulse force, the clamping mechanism being configured in use to selectively couple together the mass and a second portion of the continuously rotating structure, wherein the second unidirectional force, the second unidirectional torque, the second unidirectional moment or the second unidirectional couple exerted on the mass by the actuator emulates the second impulse force.

* * * * *